(12) United States Patent
Benhammou et al.

(10) Patent No.: US 10,593,198 B2
(45) Date of Patent: Mar. 17, 2020

(54) INFRASTRUCTURE TO VEHICLE COMMUNICATION PROTOCOL

(71) Applicant: FLIR Commercial Systems, Inc., Goleta, CA (US)

(72) Inventors: Daniel Benhammou, Littleton, CO (US); Tyler Birgen, Denver, CO (US)

(73) Assignee: FLIR COMMERCIAL SYSTEMS, INC., Goleta, CA (US)

( * ) Notice: Subject to any disclaimer, the term of this patent is extended or adjusted under 35 U.S.C. 154(b) by 0 days.

(21) Appl. No.: 15/708,694

(22) Filed: Sep. 19, 2017

(65) Prior Publication Data
US 2018/0158328 A1    Jun. 7, 2018

Related U.S. Application Data

(60) Provisional application No. 62/430,724, filed on Dec. 6, 2016.

(51) Int. Cl.
*H04L 9/32* (2006.01)
*H04L 9/08* (2006.01)
(Continued)

(52) U.S. Cl.
CPC ............. *G08G 1/0125* (2013.01); *B60Q 9/00* (2013.01); *B60T 7/12* (2013.01); *B60T 7/18* (2013.01);
(Continued)

(58) Field of Classification Search
CPC .... G08G 1/097; G08G 1/07; G08G 1/096783; G08G 1/096716; G08G 1/096844; G08G 1/0116; G08G 1/0141; G08G 1/00; G08G 1/0104; G08G 1/091; G08G 1/096725; G08G 1/096758; G08G 1/096822;
(Continued)

(56) References Cited

U.S. PATENT DOCUMENTS

| 6,092,202 | A | * | 7/2000 | Veil | .................. G06F 21/34 705/64 |
| 6,321,333 | B1 | * | 11/2001 | Murray | ................. H04L 9/3265 713/156 |

(Continued)

FOREIGN PATENT DOCUMENTS

| JP | 2012227672 A | * | 11/2012 |
| WO | 2012013228 A1 | | 2/2012 |

OTHER PUBLICATIONS

Golle, Philippe, Dan Greene, and Jessica Staddon. "Detecting and correcting malicious data in VANETs." Proceedings of the 1st ACM international workshop on Vehicular ad hoc networks. ACM, 2004. (Year: 2004).*

(Continued)

*Primary Examiner* — Michael Simitoski
(74) *Attorney, Agent, or Firm* — Haynes and Boone, LLP

(57) ABSTRACT

A system and method for securing and verifying transmitted traffic data. A transmitter may send a transmission via a radio signal including traffic data through or from hardware installed in a traffic control cabinet adjacent an intersection or other roadway feature of interest. The transmission may be signed with a private key. A receiver associated with a vehicle may receive, in addition to the transmission, a public key (e.g., via a data network) for use in verification of the authenticity of the transmission.

19 Claims, 14 Drawing Sheets

(51) Int. Cl.

| | | |
|---|---|---|
| *H04L 9/14* | (2006.01) | |
| *G08G 1/00* | (2006.01) | |
| *G08G 1/01* | (2006.01) | |
| *H04L 29/08* | (2006.01) | |
| *G08G 1/097* | (2006.01) | |
| *G08G 1/04* | (2006.01) | |
| *G08G 1/042* | (2006.01) | |
| *G08G 1/065* | (2006.01) | |
| *G08G 1/0967* | (2006.01) | |
| *H04M 1/725* | (2006.01) | |
| *B60T 7/18* | (2006.01) | |
| *H04L 9/12* | (2006.01) | |
| *B60Q 9/00* | (2006.01) | |
| *B60T 7/12* | (2006.01) | |
| *G06Q 30/02* | (2012.01) | |
| *G08G 1/096* | (2006.01) | |
| *G08G 1/0962* | (2006.01) | |
| *G05D 1/00* | (2006.01) | |
| *G08G 1/07* | (2006.01) | |
| *H04L 9/30* | (2006.01) | |
| *H04W 4/02* | (2018.01) | |
| *G08G 1/08* | (2006.01) | |

(52) U.S. Cl.
CPC ....... *G05D 1/0088* (2013.01); *G06Q 30/0265* (2013.01); *G08G 1/0116* (2013.01); *G08G 1/0133* (2013.01); *G08G 1/0145* (2013.01); *G08G 1/04* (2013.01); *G08G 1/042* (2013.01); *G08G 1/065* (2013.01); *G08G 1/07* (2013.01); *G08G 1/096* (2013.01); *G08G 1/097* (2013.01); *G08G 1/0962* (2013.01); *G08G 1/0967* (2013.01); *G08G 1/096716* (2013.01); *G08G 1/096725* (2013.01); *G08G 1/096775* (2013.01); *G08G 1/096783* (2013.01); *H04L 9/083* (2013.01); *H04L 9/0894* (2013.01); *H04L 9/12* (2013.01); *H04L 9/14* (2013.01); *H04L 9/30* (2013.01); *H04L 67/1097* (2013.01); *H04L 67/12* (2013.01); *H04L 67/26* (2013.01); *H04M 1/72522* (2013.01); *B60T 2201/022* (2013.01); *B60T 2210/30* (2013.01); *B60T 2210/36* (2013.01); *G08G 1/08* (2013.01); *H04L 2209/80* (2013.01); *H04L 2209/84* (2013.01); *H04M 1/72577* (2013.01)

(58) Field of Classification Search
CPC .. G08G 1/123; H04L 9/14; H04L 9/30; H04L 2209/84; H04L 2209/80; G05D 1/0088; G01C 21/26; G01C 21/3415; B60W 30/095; G06F 2207/7219
See application file for complete search history.

(56) References Cited

U.S. PATENT DOCUMENTS

| | | | |
|---|---|---|---|
| 6,911,918 B2 | 6/2005 | Chen | |
| 6,965,325 B2 | 11/2005 | Finnern | |
| 7,934,095 B2 * | 4/2011 | Laberteaux | H04L 9/006 713/169 |
| 7,979,198 B1 | 7/2011 | Kim et al. | |
| 8,155,868 B1 * | 4/2012 | Xing | G07C 5/0808 340/439 |
| 8,522,013 B2 | 8/2013 | Zhang | H04L 63/20 713/158 |
| 9,014,376 B2 * | 4/2015 | Yao | H04L 63/061 380/272 |
| 9,276,743 B2 * | 3/2016 | Cordeiro De Oliveira Barros | H04L 9/14 |
| 9,369,459 B2 * | 6/2016 | Galwas | H04L 9/3263 |
| 9,435,652 B2 * | 9/2016 | Ralston | G01C 21/26 |
| 9,672,362 B2 * | 6/2017 | Butcher | G06F 21/575 |
| 9,763,252 B2 * | 9/2017 | Kilpatrick, II | H04W 72/0473 |
| 9,774,446 B1 * | 9/2017 | Van Dijk | H04L 9/08 |
| 9,792,821 B1 * | 10/2017 | Yalla | G08G 1/167 |
| 9,800,413 B2 * | 10/2017 | Alrabady | H04L 9/321 |
| 9,836,962 B1 * | 12/2017 | Hayward | G08G 1/166 |
| 2004/0070518 A1 * | 4/2004 | Whittle, Jr. | G08G 1/095 340/907 |
| 2006/0161750 A1 * | 7/2006 | Perkins | G06F 21/6245 711/164 |
| 2007/0055877 A1 * | 3/2007 | Persson | H04L 63/0272 713/171 |
| 2007/0197231 A1 * | 8/2007 | Lin | G08G 1/123 455/456.1 |
| 2007/0223702 A1 * | 9/2007 | Tengler | H04L 9/3263 380/270 |
| 2008/0031194 A1 * | 2/2008 | Yaqub | H04L 63/062 370/331 |
| 2008/0059050 A1 | 3/2008 | Lin et al. | |
| 2009/0059874 A1 * | 3/2009 | Carter | H04W 12/08 370/338 |
| 2009/0153364 A1 | 6/2009 | Buchalo et al. | |
| 2009/0210141 A1 | 8/2009 | Young et al. | |
| 2009/0235071 A1 * | 9/2009 | Bellur | H04L 9/3268 713/158 |
| 2010/0031025 A1 * | 2/2010 | Zhang | H04L 63/0823 713/156 |
| 2010/0070167 A1 * | 3/2010 | Mudalige | G01C 21/26 701/31.4 |
| 2010/0106413 A1 * | 4/2010 | Mudalige | B60W 40/02 701/469 |
| 2010/0254282 A1 | 10/2010 | Chan et al. | |
| 2011/0012755 A1 * | 1/2011 | Mudalige | G08G 1/091 340/905 |
| 2011/0106337 A1 * | 5/2011 | Patel | G08G 1/20 701/2 |
| 2011/0138188 A1 * | 6/2011 | Lee | G06F 21/57 713/187 |
| 2011/0167275 A1 * | 7/2011 | Niemela | G06F 21/562 713/188 |
| 2011/0296180 A1 * | 12/2011 | Paeschke | B60R 13/10 713/168 |
| 2012/0026014 A1 * | 2/2012 | Miller | G08G 1/07 340/929 |
| 2012/0083996 A1 | 4/2012 | Tas et al. | |
| 2012/0143504 A1 * | 6/2012 | Kalai | G01C 21/32 701/533 |
| 2012/0159156 A1 * | 6/2012 | Barham | G06F 21/6218 713/156 |
| 2013/0063282 A1 | 3/2013 | Baldwin et al. | |
| 2013/0067220 A1 * | 3/2013 | Ando | H04L 9/3268 713/156 |
| 2013/0115915 A1 * | 5/2013 | Tipton | H04W 12/08 455/411 |
| 2013/0200223 A1 * | 8/2013 | Alexander | B61L 29/28 246/473.1 |
| 2014/0358324 A1 * | 12/2014 | Sagar | G08G 1/164 701/1 |
| 2015/0138975 A1 * | 5/2015 | Gotz | G08G 1/093 370/235 |
| 2015/0179062 A1 * | 6/2015 | Ralston | G01C 21/26 701/117 |
| 2015/0195711 A1 * | 7/2015 | Li | H04L 63/107 726/4 |
| 2015/0256534 A1 * | 9/2015 | Goudy | H04L 63/0823 713/156 |
| 2015/0360611 A1 * | 12/2015 | Cherkaoui | B60Q 9/008 340/436 |
| 2016/0112201 A1 * | 4/2016 | Misawa | H04W 12/06 713/168 |
| 2016/0112206 A1 * | 4/2016 | Cizas | H04L 9/3263 713/158 |
| 2017/0018179 A1 * | 1/2017 | Gutierrez | H04L 67/12 |
| 2017/0124865 A1 * | 5/2017 | Russell | G08G 1/07 |

(56) References Cited

U.S. PATENT DOCUMENTS

2017/0164142 A1* 6/2017 Rykowski .............. H04W 4/02
2017/0180989 A1* 6/2017 Etzel .................... H04L 9/3268
2017/0264645 A1* 9/2017 Tipton .................. H04W 12/08

OTHER PUBLICATIONS

Hao, Yong, Yu Cheng, and Kui Ren. "Distributed key management with protection against RSU compromise in group signature based VANETs." Global Telecommunications Conference, 2008. IEEE GLOBECOM 2008. IEEE. IEEE, 2008. (Year: 2008).*

Raya, Maxim, and Jean-Pierre Hubaux. "Securing vehicular ad hoc networks." Journal of computer security 15.1 (2007): 39-68. (Year: 2007).*

Studer, Ahren, et al. "TACKing together efficient authentication, revocation, and privacy in VANETs." Sensor, Mesh and Ad Hoc Communications and Networks, 2009. SECON'09. 6th Annual IEEE Communications Society Conference on. IEEE, 2009. (Year: 2009).*

IEEE. "Draft Guide for Wireless Access in Vehicular Environments (WAVE)—Architecture" IEEE P1609.0/D2, Jul. 2016. (Year: 2016).*

IEEE. "IEEE Standard for Wireless Access in Vehicular Environments—Security Services for Applications and Management Messages", Jan. 2016. (Year: 2016).*

Qin, Bo, et al. "Distributed privacy-preserving secure aggregation in vehicular communication." Intelligent Networking and Collaborative Systems (INCoS), 2011 Third International Conference on. IEEE, 2011. (Year: 2011).*

Yan, Shuxian. "Analysis and detecting of misbehaviours in VANETs." (2014). (Year: 2014).*

Zhang, Feng, Jianjun Hao, and Shan Li. "Traffic information aggregation and propagation scheme for vanet in city environment." Broadband Network and Multimedia Technology (IC-BNMT), 2010 3rd IEEE International Conference on. IEEE, 2010. (Year: 2010).*

* cited by examiner

INFRASTRUCTURE TO VEHICLE COMMUNICATION PROTOCOL

RELATED U.S. APPLICATION DATA

This application claims the benefit of U.S. Provisional Application No. 62/430,724, filed on Dec. 6, 2016, the entire contents of which are incorporated herein by reference.

FIELD OF THE INVENTION

The present invention relates generally to securing communications that may be transmitted from infrastructure associated with a roadway network. The technology may be implemented with existing systems and hardware or may be incorporated with proprietary systems. The invention has particular advantages for improving traffic safety by preventing spoofed signals.

BACKGROUND

Existing traffic signals at intersections and along roadways utilize various traffic hardware devices to affect or monitor signalization. Generally, these devices are positioned adjacent to the intersection they impact and are frequently disposed upon traffic signal poles or arms (e.g., cameras), within a traffic control cabinet (e.g., conflict monitor unit), or in/on the roadway pavement (e.g., loop detector). Traffic control cabinets are well known within the industry and generally comprise an enclosure constructed from metal or plastic to house electronic equipment associated with a traffic signal or other traffic control/monitoring devices. For example, the National Electrical Manufacturers Association specifies various cabinet types which may be effective for housing embodiments of the present invention. Some specific, non-limiting examples include a NEMA P-44 or Model 332 marketed by Trafficware®, Econolite®, McCain®, etc. As used herein, "traffic control cabinet" may also refer to a control device disposed adjacent to a railway or at-grade railway crossing.

Within a traffic control cabinet, a control assembly may be used to manipulate the various phases of a traffic signal. The operation of the traffic signal may be adaptive, responsive, pre-timed, fully-actuated, or semi-actuated depending upon the hardware available at the intersection and the amount of automation desired by the operator (e.g., municipality). For instance, cameras, loop detectors, or radar may be used to detect the presence or location of a vehicle. In response to a vehicle being detected, a traffic signal controller may alter the timing of the traffic signal cycle, for example, to shorten a red light to allow a waiting vehicle to traverse the intersection without waiting for a full phase to elapse. As another example, a traffic signal controller may extend a green phase if it determines an above-average volume of traffic is present and the queue needs additional time to clear before initializing a red phase.

Motorists are frequently concerned with the duration of drive times and seek to identify routes that may reduce overall travel time. Often this includes avoiding intersections which are characterized by either long red phases or excessive traffic congestion causing a queue too large to clear during a single signal cycle. However, the nature of traffic congestion makes it very difficult to predict and therefore difficult to avoid. For instance, traffic collisions and stalled vehicles may occur anywhere within a traffic network, causing a localized disturbance in traffic flow which may ripple throughout the system.

Additionally, not all disruptions in traffic flow are caused by substantial events such as collisions and breakdowns. In many instances, minor delays are created by human behavior which may aggregate into significant delays. For instance, a minor delay may be created following a red light phase during which a driver may not instantly react to the fact that the light has changed to green. This may be caused by the driver being distracted or simply by the human delay in perceiving the change and then reacting to it. Although a single instance of such a delay may be only a few seconds or even less than one second, the aggregated effect of dozens or hundreds of these delays throughout a corridor may add up to a consequential delay.

Safety is a primary concern in the operation of motor vehicles. In some instances, a driver may be distracted by a mobile device, a passenger in the vehicle, or an interesting object or occurrence outside the vehicle. For instance, lingering car accidents or traffic stops by police often distract uninvolved drivers as they pass by. Unfortunately, distractions frequently lead to collisions, injuries, and fatalities.

Another problem in the industry involves security vulnerabilities in communication protocols. This is a concern in a variety of contexts, including connected, autonomous or semi-autonomous vehicles. For example, messages between one traffic signal and another, or between a traffic signal and a vehicle may be spoofed or otherwise accessed by unauthorized parties. One concern in this regard is that a communication may be sent to a vehicle (or a device associated with a vehicle) emulating a message from a traffic signal but which contains false information. For example, the message may indicate that a given approach to an intersection is currently under a green phase when in fact it's a red phase (or vice versa). Such communications may cause traffic collisions. A means of securing and authenticating communications from traffic signals is needed to prevent such spoofing or unauthorized access.

SUMMARY OF THE INVENTION

One embodiment of the present invention is installable in or adjacent to traffic control cabinets located at roadway intersections, at-grade rail crossings, or otherwise adjacent to roadways, and may collect data from various traffic hardware devices associated with the respective intersection. In one aspect, the invention is a localized data collection module ("LDCM") which may be connectable to an existing data bus within a traffic cabinet. An LDCM may detect electric signal changes within a data bus and interpret them into useful data, such as messages sent from various sensors. For example, a loop detector may send a signal that a vehicle has passed over the loop. This signal may be sent through the data bus to other hardware such as a traffic signal controller. An LDCM may intercept the signal and identify it as a signal from the loop detector indicating the presence of a vehicle.

Alternatively, an LDCM may be in direct communication with a processor (the term "a processor" as used herein may refer to a single processor or a plurality of processors configured to perform recited functions) of a control assembly. In this regard, an LDCM may not need to intercept signals through a data bus, but rather may receive signals directly from, and may be in direct communication with, a processor associated with traffic hardware devices at an intersection. In this regard, such a processor may be operable to process various signals from a plurality of traffic hardware devices and also to communicate with an embodiment of the present invention (e.g., an LDCM) to send data directly thereto.

In either regard, the present invention may collect data from a plurality of traffic hardware devices disposed locally at a site of interest along a roadway (e.g., an intersection). This data may be comprised of traffic signal phase timings (past, current, and potential), cycle times, traffic counts, camera imagery, radar signals, loop detector responses, conflict monitor alerts, etc. Any data generated locally by traffic hardware devices may be considered relevant to the present invention and may be collected accordingly. The data may be collected using any protocol including but not limited to serial, USB, FTP, SDLC, Ethernet, or general I/O. The data may be compiled and aggregated locally by the present invention. The aggregated data may be transmitted over a network connection (e.g., 802.11, LTE, Bluetooth, Ethernet, fiber optic, satellite, radio, etc.).

The data may be received at a data center for storage in a cloud-based architecture. In this regard, the data may be accessible remotely from any location via a network connection. Alternatively or additionally, data may be received at a traffic control center for use by a municipality operating the respective traffic network.

Traffic data (e.g., related to roadway, railway, vehicles, etc.) from various traffic hardware devices and other components associated with a traffic control cabinet, as well as status data pertaining to the state and condition of an LDCM itself, may be analyzed by an LDCM to trigger certain actions in accordance with rules stored on a memory module of the LDCM. For instance, a rule may contain instructions to generate an email alert to a client when a rule has been satisfied, indicating that a power failure has occurred. As another example, a similar alert may be generated for the failure of a traffic camera, or any other traffic hardware device. The health of the LDCM may also be monitored, and alerts may be transmitted if an internal temperature exceeds a threshold, if voltage drops below a threshold, etc. Notably, traffic data may be transmitted to a cloud platform, and the cloud platform may analyze the traffic data to determine if an alert is to be generated.

It should be appreciated that many hardware options exist for the implementation of the current invention. For example, a storage device may be disposed locally in a traffic cabinet to at least temporarily store all of the data being received. This may be a stand-alone storage device or it may be incorporated into (e.g., housed within) an LDCM. Data may be stored temporarily as it is received and periodically transferred from an LDCM to a remote location via a network connection. For example, one hour worth of data may be acquired at which point the data may be sent to a cloud storage location. After confirmation is received that the data has been properly duplicated, the local storage device may erase the data locally such that capacity is created for collecting a subsequent period of data. Alternatively, data may be streamed out as it is received such that data may be remotely accessible in real-time. Additionally, local storage may be used to cache data during network outages such that data loss is avoided or minimized.

A conventional server may be disposed locally (e.g., in a traffic control cabinet) or remotely (e.g., in a traffic control center). A server may be operable to allow access to data by a plurality of client applications through application program interfaces ("APIs"), for instance. For example, a municipality may access data to ascertain and analyze the state of the traffic network. The information may be useful, for example, to reduce congestion, improve travel times, increase safety, plan future roadway improvement projects, coordinate advertisements (as discussed below), etc. A server as utilized by the present invention, may include an input port operable to receive data (e.g., traffic information) through a network, a memory module to store logic, a processor to apply the logic to the data received, and an output port to transmit data to another location or device (e.g., a cloud storage data center, a vehicle, etc.). A server may be an independent unit or may be integrated with an embodiment of the present invention. For instance, a localized data collection module may comprise a server.

Although current traffic operations are generally controlled locally within a municipality, the present invention may enable traffic control centers to be located anywhere around the globe. As has been discussed, data collected by the present invention may be transmitted to a cloud-based location such that the data is accessible remotely. In this regard a central traffic center may be set up to control the operations of a plurality of municipalities (or other entities responsible for traffic operations). This may be advantageous, for instance, in coordinating traffic operations throughout an entire metropolitan area rather than having each entity within the area operate their traffic network independently, which may create conflicts (e.g., where one municipality's traffic network borders another's and traffic signals are not coordinated across the border) that exacerbate congestion or travel time issues.

In another aspect, the present invention may be a set of computer readable instructions operating on a processor to perform the various functions described herein. The set of computer readable instructions may be stored in local memory such as on an LDCM, it may be installed on existing hardware within a traffic control cabinet, or it may be stored in a remote location accessible through a network connection. Accordingly, the present invention may be deployed within existing traffic control infrastructure.

In yet another aspect, the present invention may be operable to perform various procedures associated with traffic data and the transfer thereof. For example, the present invention may synchronize a clock (either an existing clock integrated with traffic hardware devices such as a traffic signal controller or a clock provided within the present invention) with a clock of a remote device for data synchronization. This procedure may be conducted using a GPS signal, an NTP server, contact closure, or any other method which allows the local devices and the remote devices to maintain time synchronization. In this regard, the local clock (e.g., at a traffic signal) and the remote clock (e.g., at a cloud server) may be maintained in unison such that stored and transmitted data are associated with time stamps which are reliable on both ends of a data transfer. These time stamps may be used to ensure all data is transferred from the local site to the remote site and also that no data is transferred more than once. Thus, a data transfer may be performed in which only data recorded up until a certain time is sent, a record of this time is created, and the next data transfer only includes data which was recorded after the aforementioned recorded time.

The present invention may be operable not only to receive data from various traffic hardware devices, but it may also be able to retrieve data. For example, the present invention may send a request to a traffic hardware device, in response to which the traffic hardware device transfers the requested data. In this regard, the data may either be pushed by the various traffic hardware devices to the present invention or the present invention may retrieve the data as needed. Furthermore, the present invention may be operable to validate the data it receives. In this regard, the data may be inspected as it is received to ensure it is in the proper format and has not been compromised. Before transmitting the data, the present invention may compress the data to reduce the volume needing to be transmitted and may encrypt the data (e.g., using SSL or any other encryption technique) to ensure privacy and security.

In an embodiment, an LDCM comprises the following features:

| Connectivity | |
| --- | --- |
| Cell Modem | 3G/LTE/GSM/GPRS; 4G Optional |
| WiFi | Travel Time (Receive Only) |
| Ethernet Port | Standard - 2 ports (10/100 Base-T) |
| EIA-232 | Yes |
| SDLC | Standard (NEMA TS-2 controllers & MMU's) |
| USB | Standard - 2 ports |
| Bluetooth | Optional |
| Aux. Ports | Standard - 8 ports (RE-485 inputs) |
| Cabinet I/O | |
| Analog Inputs | 16 (8 × 120 VAC; 8 × 24 VDC) |
| Digital Inputs | 20 (16 × 24 DC; 4 × 24 VDC) |
| Time Sync | Normally Open and Normally Closed with user selectable time |
| Digital Outputs | 3 (either Normally Open and Normally Closed 5 A relay) |
| Miscellaneous | |
| Operating System | Linux - Ubuntu 12.04.2 LTS kernel ver. 3.15.3 |
| GPS | Geolocation with Time Sync |
| Operating Temperature | −40° F. to 176° F. |
| Humidity | 0-95% Non-Condensing |
| Dimensions | 5.5" (D) × 8.2" (H) × 3.5" W |
| Weight | 3.6 lbs. |
| Power Input Voltage | 8-28 VDC (2 A 250 V 5 mm × 20 mm Fast-bio fuse) |
| Real-time Clock | Yes |
| Flash Disk | Yes |
| Battery Backup | Yes - allows communications and logging up to ~5 hours |
| Battery | Non-Spillable Sealed Lead-Acid 6 VDC 4.5 Ah |
| Protocols | |
| SDLC | Standard (Ts2 or TS2 Type 2 cabinets only) |
| RS-485 | Standard up to 32 channels of input |
| iCITE ™ | Used to connect to iCITE ™G2 ™ |
| Other | |
| Solar Power Capable | Yes |
| Antenna | 5 band (Cellular, GPS, WiFi, Bluetooth and DSRC) |

In one embodiment, a localized data collection module may include a least one input port, a time synchronization module, a power module, a backup battery, a multi-band antenna, a data modem, a data storage module, and a processor. An input port may be operable to receive data from either wired or wireless communications channels. For example, a traffic hardware device, such as a camera, may wirelessly transmit video footage (which may include still frames) to the LDCM and such video footage may be received through the input port. In this regard, an input port may comprise or may be in operative communication with an antenna, an Ethernet port, a coaxial port, etc. Notably, localized data collection modules may be able to transmit data from one LDCM to another. In this regard, an input port may receive incoming data from other LDCMs. LDCMs may form a data chain such that data is transferred from a first LDCM to a second LDCM, from the second LDCM to a third LDCM, and so on until the data reaches a communications channel which provides a connection to a remote terminal or storage location. A time synchronization module may comprise a clock, or may be in operative communication with a clock. A time synchronization module may comprise a global positioning system receiver operable to calculate a local time based on signals received from at least one satellite transmitter. A time synchronization module may comprise instructions for a processor to maintain a local clock in synchronization with a remote clock. A power module may comprise a power connection for attachment of a power cable to an LDCM. The power cable may transfer power to an LDCM from any power source available. For example, a power source may be a solar panel, an electric power grid, etc. A multi-band antenna may be any antenna operable to receive data, and perhaps even transmit data, via more than one radio frequency band. Radio frequency bands receivable by a multi-band antenna may include any radio frequency bands such as, but not limited to, cellular, 3G, 4G, LTE, GPS, WiFi, Bluetooth, DSRC, GSM, GPRS, etc. A data modem may be any device capable of transmitting data to an external receiver. Transmission of data from a data modem may be via a wired or wireless channel. For example, a data modem may comprise an Ethernet connection, a fiber optic connection, a radio frequency transmitter operative on any of the previously described bands, a telephonic connection, a coaxial connection, etc. A data storage module may comprise any means of storing data, including but not limited to, a flash memory device, a hard disk drive, a solid state hard drive, etc.

A localized data collection module may be installable in a traffic control cabinet. In this regard, an LDCM may be sized and configured to be installed into an existing traffic control cabinet which has been installed at a roadway intersection or other roadway point of interest. Alternatively, an LDCM may be installable on an external wall of a traffic control cabinet should there not be a sufficient volume of space available for installation inside the traffic control cabinet. Additionally, an LDCM may be installable adjacent to a traffic control cabinet such as in an in-ground utility box or on a support mast. In this regard, a support mast may refer to a mast used to support traffic signals in a position above or adjacent a roadway, or may also refer to a mast, such as a pole or stake, used to support an LDCM in a location near traffic hardware devices.

An LDCM may be operable to receive traffic data from at least one traffic hardware device (e.g., traffic controller, data bus, crosswalk pedestrian push button, camera, loop detector, radar device, thermal sensor, crossing arm, train detection circuit, etc.), to store at least a portion of the traffic data locally in a storage module, to process at least a portion of the traffic data locally to generate an alert (e.g., applying locally stored rules to the traffic data to determine whether or not a condition is satisfied), and to transmit at least a portion of the traffic data to a remote facility. An alert generated by an LDCM may provide a remotely disposed client (such as a municipality) an indication of a status of a device in operative communication with the localized data collection module. In this regard, an alert may notify a client that a camera has detected undesirable weather conditions, a traffic controller is overheated, a loop detector is inoperative, a power source is providing less than the recommended voltage, a power surge has occurred at the traffic control cabinet, etc. In fact, an alert may include any information that a client may find relevant for continued operation or monitoring of the intersection and equipment associated therewith. An alert, in this sense, may itself be a message which is communicated to the client, or may be a signal which is transmitted to a remote device disposed at another location to cause the remote device to generate a message to be sent to the client. For example, an LDCM may not have the capacity to transmit an email message. Therefore, an LDCM may send an alert to a remotely disposed email server, instructing the server to generate an email to the client. Notably, alerts or messages sent to clients may utilize any appropriate means of communication. For example, a telephone call may be placed, a text message may be sent, or a notification may be made available through a web-based interface such that the message is made available when a client logs in to the interface.

In another embodiment, a system for aggregating and communicating traffic data may be provided. Such a system may comprise a traffic control cabinet disposed adjacent to a roadway intersection, a plurality of traffic hardware devices operable to collect traffic data, a localized data collection module, and a remote storage facility. Such a remote storage facility may be a municipal traffic control center, a cloud-based storage center, or any other appropriate storage device disposed remotely from an LDCM. Data may be transmitted to the remote storage facility via a wireless communications channel, a wired connection, or both. In some implementations, existing traffic control cabinets (or others to be installed in the future) are not connected to robust data channels such as a cable or fiber optic network. In some instances, existing traffic hardware devices at an intersection are only able to communicate locally with other devices and there is no means of accessing the devices or data contained thereon from a remote location. An LDCM as disclosed herein may be operable to provide a data connection from a signalized intersection to remote devices. In this embodiment, a localized data collection module may be disposed within the traffic control cabinet and may be operable to aggregate traffic data from a plurality of traffic hardware devices and transmit at least a portion of the traffic data to a remote storage facility.

In another embodiment, the present invention may include a method of aggregating and communicating traffic data. The method may include generating traffic data by observing conditions present at a roadway intersection using a plurality of traffic hardware devices, transmitting traffic data to a localized data collection module disposed within a traffic control cabinet via a plurality of communications channels (or the devices may transmit on a single channel), receiving the traffic data at the localized data collection module via a plurality of input ports (or alternatively through a single input port), storing at least a portion of the traffic data in a memory module disposed within the localized data collection module, validating at least a portion of the traffic data using a processor disposed within the localized data collection module, compressing at least a portion of the traffic data using the processor, encrypting at least a portion of the traffic data using the processor, transmitting at least a portion of the traffic data to a remote storage facility, and receiving a confirmation, from the remote storage facility, indicating that at least a portion of the traffic data is successfully received at the remote storage facility. Notably, each of these steps may be optional in various implementations of the present invention.

Furthermore, transmitting at least a portion of the traffic data to remote storage facility may comprise sending at least a portion of the traffic data through a wireless communications channel such as 3G, 4G, LTE, GSM, or GPRS. Alternatively or additionally, transmitting at least a portion of the traffic data to remote storage facility may comprise sending at least a portion of the traffic data through a wired communications channel, such as Ethernet, fiber optic, or cable.

The method may further involve accessing a clock maintained by the localized data collection module, assigning time stamps to traffic data as it is received, recording a first time stamp indicating a first time associated with a first data transfer to the remote storage facility, wherein the first data transfer comprises traffic data stored at the localized data collection module and assigned time stamps indicating times of receipt before the first time, and recording a second time stamp indicating a second time associated with a second data transfer, wherein the second data transfer comprises traffic data stored at the localized data collection module and assigned time stamps indicating times of receipt after the first time and before the second time.

The plurality of communications channels described above may be in operative communication with a data bus disposed within the traffic control cabinet. The data bus may interconnect a plurality of traffic hardware devices for transmission of data messages between various traffic hardware devices. Transmitting the traffic data to a localized data collection module may comprise intercepting the data messages as they are transmitted between the plurality of traffic hardware devices via a communications channel (could be any appropriate means such as a wire or Bluetooth) linking the data bus to the localized data collection module.

Although traffic data, as used herein, may comprise a wide variety of information, some non-limiting examples of information which may be included in traffic data include video footage, a traffic signal cycle timing schedule, a volume of traffic observed at an intersection during a specified period of time, an observed time required for a vehicle to traverse a path leading to the roadway intersection (e.g., a camera or sensor at remote location may detect a vehicle and, in response, initiate a timing sequence which is terminated when the vehicle is detected at the roadway intersection), personally identifiable information (e.g., license plate number or an image of a driver's face), etc.

Another aspect of the present invention is a cloud platform. A cloud platform may be operable to receive, process, store or retrieve traffic data. All data received by such cloud platform may be managed by proprietary architecture. Data may be decompressed, decrypted, processed and stored. Databases associated with the architecture may utilize primary keys which allow for efficient data storage and retrieval. Data may be homogenized by storage with a high level of resolution such that information of the same type but from different traffic hardware devices with different data formatting structures may be stored and accessed in a similar format. The data may be utilized through a web-based portal for accessing, analyzing, or creating visualizations of the data.

Another aspect of the present invention is a method of communication between traffic signals and vehicles. Communications may be sent via any wireless means of transmission (e.g., radio). In this regard, a traffic signal may be able to communicate to a vehicle information about the state of the traffic signal (e.g., Signal Phase and Timing ("SPaT") message, current signal output, emergency vehicle data, etc.). For instance, current phase information may be sent, thereby letting the vehicle know that a light is currently red for example, allowing the vehicle to safely slow to a stop. This may be particularly advantageous for autonomous or connected vehicles to allow them to safely traverse intersections efficiently and without collisions.

Notably, the present invention is not limited to only autonomous vehicles but has advantages which are applicable to manually operated vehicles as well. For instance, communications from a light may be utilized to generate an alert to a driver. In this regard, if a vehicle is approaching a red light and not slowing down, an audible tone or message may be conveyed to the driver as a warning. Also, a driver may be alerted to begin moving if distracted when a green light appears or is about to appear. It should be appreciated that a traffic signal or associated traffic hardware devices may, but need not, communicate with a vehicle itself. For instance, a device associated with a vehicle, rather than a vehicle itself, may receive communications. For example, a traffic signal monitoring device may be disposed in a vehicle. Such a device may include an antenna for receiving signals from traffic lights (directly or through a network), an output port for transmitting instruction or alert signals to the vehicle or other devices (may be Bluetooth, wired connection, etc.), a speaker for generating audible alarms, a GPS receiver for identifying the vehicle's location and generating a data set comprising location information, or logic for applying rules which associate location and traffic signal phases to generate alerts. A traffic signal monitoring device may be: integrated with a vehicle, a stand-alone unit installed by the manufacturer, an after-market accessory, or any other device with the described functionality (e.g., an occupant's mobile phone). For example, a traffic signal monitoring device may include an in-dash display console.

Another aspect of the present invention is a security and authentication protocol for communications between traffic signals and vehicles (including devices within vehicles). In this regard, a public/private key system may be used to authenticate that a signal received by a vehicle is relevant to a particular traffic signal. This may be advantageous for securing messages (determining which communications may be fake, e.g., spoofed) and also for filtering out messages that are being transmitted by a traffic signal within range of the vehicle but which are not from the traffic signal at the intersection the vehicle is approaching. In this regard, a vehicle may be receiving communications from a plurality of traffic signals at any given moment. However, there may be a particular signal (or signals) which is most relevant at that moment. For instance, a vehicle approaching an intersection may primarily concern itself with that intersection's traffic signal communications and may ignore the communications from all other traffic signals being received. Alternatively, the communications from the other traffic signals may also be processed and the data may be stored in order to be utilized as the vehicle approaches those particular traffic signals. In some instances, extraneous traffic signal communications may be received from intersections which are not pertinent to a vehicle's planned route and therefore may be ignored or discarded. In that same regard, a vehicle may store data from all traffic signals along its planned route which it receives. This may allow logic within the vehicle (or associated device) to plan a route, braking, accelerating, or other functions well before reaching a particular intersection. For example, a vehicle may be able to plan ahead several traffic signals by analyzing current traffic conditions and traffic signal cycle timings in order to determine an optimal strategy regarding routing, speed, etc. to reduce travel time or improve fuel efficiency.

In order to properly utilize communications being received, a vehicle may need to identify which particular communication is being sent by which particular intersection's traffic hardware devices (e.g., an LDCM, traffic signal controller, etc.). Moreover, a need may exist to determine which specific approach is transmitting a particular communication. For instance, a northbound vehicle with a planned left turn may need to determine which communication being received is indicative of the northbound left-turn traffic signal, as opposed to the other approaches for that particular traffic signal or other intersections altogether. A vehicle may employ various methods for determining its geographical location in order to ascertain which traffic signal is most relevant at a given time. One such method may be to utilize a global positioning satellite ("GPS") signal. In this regard, a vehicle's GPS receiver (or any other GPS receiver associated with a vehicle such as an occupant's mobile phone) may ascertain the location of the vehicle and convey that data to a processor or logic. The location data may be used to identify which traffic signal's communications are most immediately relevant.

In this regard, public/private key pairings may assist a vehicle (or associated device) in filtering communications and verifying their authenticity. Each traffic signal (or each traffic data transmitter associated with a traffic signal or other feature of interest such as a traffic sign, emergency vehicle access, truck entrance, merge lane, rail crossing, etc.) may be assigned a secret (i.e., private) key for signing the information which it transmits and also a public key for authentication by vehicles. Each traffic signal monitoring device may have access to a unique public key for each intersection (or other feature of interest) in a traffic network. Public keys may be subscribed to by a vehicle and downloaded or accessed over a network or may be uploaded to a vehicle from a memory device (e.g., flash memory, hard disk drive, SD card, etc.). In this regard, a vehicle may access public keys for every traffic signal anticipated along its planned route. A vehicle may additionally or alternatively access public keys for all traffic signals within a given radius of the vehicle or region so that the public keys are available for use by the vehicle if/when it changes its route. Public keys may be retrieved or received before a vehicle embarks on a trip or while a vehicle is in use. A vehicle may be able to verify authenticity of each message by using a public/private key pair. Moreover, because every traffic signal, and perhaps even every approach, may have its own public/private key pair, a vehicle may be able to identify which traffic signal is the source of a particular communication.

Keys may be generated, issued, and revoked by a Trusted Key Authority. In the event it is determined that a private key has been compromised, the Trusted Key Authority may update that traffic signal's key. A web-socket connection may be initiated over a secure socket layer ("SSL") connection to a server. Upon notification of a compromised key, a server may immediately push a new key to a traffic signal for signing future communications. This procedure may also be used pro-actively to prevent spoofing before it occurs.

Another aspect of the present invention is a mobile application. Such an application may be installed within a vehicle's integrated memory (e.g., navigation system, radio receiver, etc.) or on a mobile device (e.g., cellular telephone). Although this disclosure primarily discusses the application as it applies to a mobile device, it is similarly applicable as an integral feature of a vehicle. An anticipated function of the mobile application is to provide improved safety for motor vehicle operation. In this regard, logic may be implemented to apply certain rules which generate alerts to drivers. For example, the application may force a mobile device to suppress notifications (e.g., text message received, incoming phone call, new social media post) while a vehicle is in motion. In this regard, a driver may not receive notifications which may distract the driver while operating the vehicle. While suppressing notifications, the application may also be receiving data (e.g. directly through infrastructure to vehicle (I2V) or infrastructure to mobile (I2M) technology) or accessing data (e.g., through an internet connection) associated with traffic signals along a vehicle's route such as current or projected traffic signal information.

If, for instance, a vehicle stops at a red light, the application may receive data associated with that traffic signal which indicates the light will remain red for at least some period of time (e.g., sixty seconds). Logic implemented by the application may determine that the remaining time is sufficient for the driver to review the notifications which are currently being suppressed. Therefore, the application may allow the mobile device to provide the notifications to the driver, thus allowing the driver to access content (e.g., new text message, missed phone call data, or new social media posts). As a traffic signal nears the end of a red light, the application may once again begin suppressing notifications and/or lock the device. The application may also generate an alert which notifies the driver that the red light will soon change to green (e.g., within 3 seconds) in order to allow the driver to refocus on operating the vehicle. One should appreciate that the previously described functionality may prevent a driver from being distracted while driving, yet allow the driver to interact with his/her phone while stopped at traffic signals. Additionally, minor traffic delays may be avoided by alerting drivers to changes in traffic lights before they occur, thus allowing drivers to be prepared rather than distracted.

In another embodiment of a mobile application, an alert may be generated to prevent a vehicle from running a red light or colliding with another vehicle. In this regard, the application may detect that a mobile device is currently unlocked or the application may receive or retrieve data from the mobile device indicating key strokes, screen swipes, or other input from the user. This information may allow the application to recognize that the mobile device is currently being operated by a driver. Contemporaneously, the mobile device may be receiving traffic signal communications from a nearby intersection which the vehicle is approaching. If a red or amber light is being indicated for the driver's approach, if a red or amber light will soon be displayed, or if traffic is currently stopped or slowly moving at the intersection, the application may generate an audible or visual alert notifying a driver of the hazard which may permit the driver (or artificial intelligence) to safely decelerate the vehicle. One should appreciate that such an application, associated logic, or processor may access and utilize various data in determining if or when alerts should be generated. For example, GPS location may identify the vehicle's speed and direction, gyroscopes or accelerometers may measure acceleration/deceleration, or third-party navigation applications may provide route data. All of this data, and more, may be employed by the application and its associated logic, or may be sent to a server for processing.

As mentioned above, the present invention may also be advantageous for implementing advertising strategies. For instance, traffic data may be combined with application data to determine that a driver is currently stopped at a red light, that the red light is expected to last for at least a certain period of time (e.g., 20 seconds), that the driver is at a certain location and that the driver is currently running the application on his/her mobile device. This information may allow a remote server to select an advertisement to push to the driver's mobile device for immediate or delayed playback. Alternatively or additionally, advertisements may be sent to and stored on the device for subsequent selection for playback by the device. The advertisement may be selected, for example, based upon the driver's proximity to a given business, the duration of a video advertisement in relation to the traffic signal timing, etc. Moreover, a pricing model may be constructed which incorporates various factors such as a driver's proximity to a business being advertised, how long an advertisement may be displayed without interfering with the driver's operation of the vehicle, etc. As an example, a business may agree to a higher payment for an advertisement that will be displayed for thirty seconds on a mobile device of a user within a quarter-mile of a business than the same business would pay for an advertisement that will be displayed for ten seconds on a mobile device of a user over a mile away from the business. This dynamic pricing model may be desired to relate pricing with advertising hit rates.

There are many alternatives to the specifics discussed herein. For one thing, any of the features shown in any of the discussion provided herein could be incorporated into or combined with any other feature or design discussed herein. As a further example, any of the functionality of any of the described components could be combined with other components or further separated (e.g., method elements may be performed in other sequences, system elements may be combinable with method elements, etc.). While the embodiments of the invention described in the foregoing description are illustrative, they are merely examples and not restrictive in character. Furthermore, the word "or" as used within this application may be interpreted as "and/or" such that any combination of elements within the phrase may be included. The word "vehicle" may reference not only any means of transportation on a roadway (e.g., motor vehicle, car, truck, bicycle, motorcycle, autonomous vehicle, manually operated vehicle), but may also reference a device which is disposed within or integral with a vehicle (e.g., a cellular phone, tablet, laptop computer, traffic signal monitoring device, etc.).

DETAILED DESCRIPTION

Figure 1:
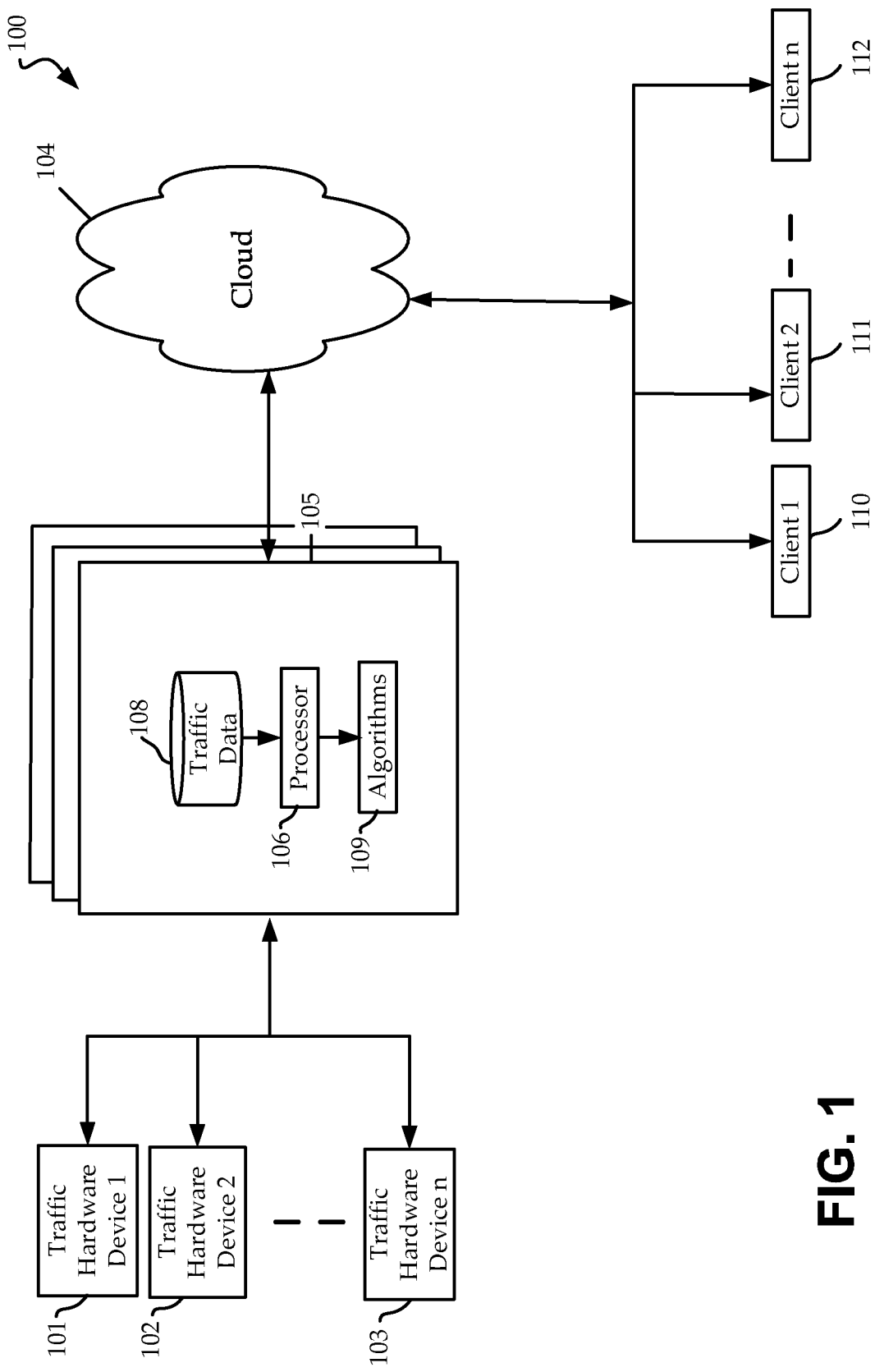
FIG. 1 illustrates a schematic arrangement of a traffic signal data communication system according to an embodiment of the present invention.

FIG. 1 illustrates a system 100 operable to collect and transmit traffic data to a remote location. In the illustrated system 100, traffic signal information is obtained by a network of traffic hardware devices 101-103. Traffic hardware devices may be, for example, a traffic controller, traffic camera, intersection controller, inductive loop detector, microwave detector, magnetometer, traffic radar, thermal sensor, conflict monitor, general hardware I/O, road weather information system, battery backup system, etc. The traffic hardware devices 101-103 may be disposed within, on, under, adjacent, above, or otherwise relative to a roadway. Traffic hardware devices may be stored, for example, within a traffic control cabinet or upon a support mast. The traffic hardware devices may provide raw or preprocessed data to an LDCM 105. The LDCM 105 may be embodied as a single device or may be distributed across multiple devices in operative communication with one another. The traffic hardware devices 101-103 may be connected to the LDCM 105 via a wireless and/or wired connection. Such a connection may be via a network or direct communication channel. The traffic hardware devices 101-103 may comprise or may be connected to an intersection controller which is, in turn, in communication with LDCM 105. As another alternative, the LDCM 105 may be connected to or in communication with a data bus, for example within a traffic control cabinet, in order to intercept communications between traffic hardware devices 101-103 and an intersection controller or other module. In this regard, traffic hardware devices 101-103 may not be configured to send data to the LDCM 105, but rather, the LDCM 105 may intercept data as it's relayed between the traffic hardware devices 101-103.

The illustrated LDCM 105 includes a processor 106 that can access data including traffic data stored on memory module 108. Such traffic data may be obtained from traffic hardware devices 101-103. In addition, processor 106 may access one or more algorithms 109 stored within memory module 108 to process desired traffic data. LDCM 105 may output resulting information to one or more clients 110-112. For example, clients 110-112 may include traffic monitoring applications running on devices of motorists, running on terminals of government planners, or running on any other desired platform. LDCM 105 may additionally or alternatively output data to a cloud system 104 for remote storage and/or processing, as explained in further detail below in regard to FIG. 3.

Figure 2:
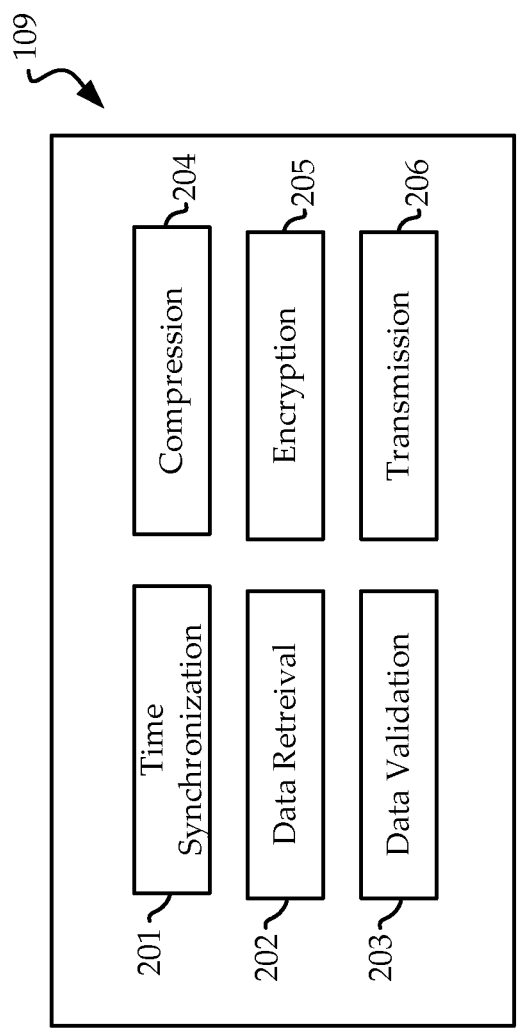
FIG. 2 depicts algorithms that may operable in the system of FIG. 1.

Turning to FIG. 2, some examples of algorithms 109 from FIG. 1 are shown. These algorithms may be stored in a non-transitory computer readable medium such as a memory module of an LDCM or otherwise accessible by an LDCM to perform the described functionality. Each algorithm may be computer readable instructions which are executable by a processor (e.g., processor 106 of FIG. 1). Time synchronization algorithm 201 may be operable to maintain a local clock (e.g., at the intersection) in synchronization with a clock disposed remotely (e.g., at a cloud storage facility). The time synchronization algorithm 201 may comprise instructions regarding accessing or receiving time signals from a GPS receiver, NTP server, or any other appropriate device functional to ascertain an accurate time. A similar algorithm may be operative to maintain a clock at a remote storage location. In this regard, a clock disposed locally may be maintained in unison with a clock disposed at a remote storage location. Data transfers may be conducted in a manner utilizing such clocks which preserves the integrity of the data to prevent data loss. That is to say, accurate synchronization of the clocks may permit periodic data transfers with reliable recording of times associated with the data.

As data is received at a traffic control cabinet from various traffic hardware devices (e.g., traffic hardware devices 101-103 of FIG. 1), the data may be associated with a time stamp indicating a time at which the data was sent, received, etc. Time stamps may be transmitted by traffic hardware devices indicating the times at which various information was observed or received. In this regard, individual traffic hardware devices may maintain an internal clock and transmit time information with other data to a traffic controller (e.g., in a traffic control cabinet). In such an embodiment, times associated with each piece of data are received by a traffic hardware device. Alternatively, no time information may be transmitted with data from a traffic hardware device, but rather a traffic controller or other locally disposed device may associate a receipt time with each piece of data as it is received. In either instance, traffic data and associated times may be transmitted to an LDCM.

In another embodiment, data (with or without time information) may be intercepted by an LDCM. In the event that no time information is associated with an item of data as it is intercepted, an LDCM may associate a time therewith. That is to say, an LDCM may intercept data being transferred between other traffic hardware devices via a data bus, associate a time with data as its intercepted, and store such data and time information in a memory module within or in operative communication with the LDCM.

In yet another embodiment, an LDCM may not store or record times associated with individual data entries. Rather an LDCM may utilize the time maintained by the time synchronization algorithm 201 to schedule bulk data transfers. For example, an LDCM may transfer out all stored data at 8 am. Thereafter, the LDCM may continue recording additional data received or intercepted from traffic hardware devices until the next scheduled data transfer, which may be at 10 am, for example. Any data associated with previous data transfers may be deleted or ignored during subsequent transfers. Regardless of how the clock time is utilized, it should be appreciated that accurate time keeping generated by the time synchronization algorithm 201 may enable an LDCM to ensure all relevant data is transmitted to a remote location while also ensuring data is only transmitted once rather than being duplicated in a remote database. In the event that a remote storage device detects an anomaly in received data, it may send a request to an LDCM to resend data associated with a particular time period.

Data retrieval algorithm 202 may comprise instructions for retrieving traffic data from other components or devices installed in a traffic control cabinet, adjacent a roadway, or otherwise pertinent to traffic control accessible via a communication channel. For example, a traffic controller may store or transmit data to other traffic control components or to a monitoring station. The data retrieval algorithm 202 may provide instructions to a processor for accessing such data. These instructions may include steps for establishing a VPN connection. Such a connection may enable secure communication with any relevant device such as, for example, a remote cloud platform, another LDCM (in the same or another traffic cabinet) or a traffic hardware device. An LDCM may establish a VPN connection to securely transmit information and bridge Ethernet adapters so that devices that are connected to integrated Ethernet ports can also be on the same network. The data retrieval algorithm 202 may also include steps for monitoring a data bus to identify pertinent data and to duplicate or redirect such data. In one embodiment, a signal transmitted from one traffic hardware device to another may be routed through an LDCM. In this regard, an LDCM may receive signals that are intended for delivery to another traffic hardware device. Such an LDCM may duplicate or forward a received signal to its intended recipient (e.g., storage device). In this regard, an LDCM may serve as a hub which receives a large volume of signals and directs them to their intended destination while also monitoring and/or recording data contained in such signals. In another embodiment, an LDCM may be operatively connected to at least one communication channel between at least two other traffic hardware devices. In this regard, signals between other traffic hardware devices may be monitored by an LDCM without disruption, interference, or rerouting of such signals. In other words, an LDCM may monitor data passively as it is transmitted between traffic control devices.

Advantageously, an LDCM may be operative to intercept signals between traffic hardware devices which have been previously installed and setup. In this regard, an LDCM may be installed in an existing traffic control environment without the need for reprogramming or replacing existing infrastructure. Further in this regard, an LDCM may be installable in thousands of pre-existing traffic control systems without any reconfiguration beyond simple installation of the LDCM (e.g., plug-n-play or wiring into data bus).

Data validation algorithm 203 may provide instructions to a processor (e.g., processor 106 of FIG. 1) for running check routines or otherwise verifying that received data is secure and useful. This may include verifying that data is received in a format in which it is expected to be received. In some instances, invalid data may result in a processor sending a message to a traffic hardware device from which the data was received requesting that the data be retransmitted.

Data validation may be performed in any manner known in the art or any manner developed hereafter. It may include data type validation, range and constraint validation, code and cross-reference validation, structured validation, etc. Data validation algorithm 203 may include instructions for discarding data which is invalid and cannot be replaced by retransmission from a sending device. In contrast, data determined to be valid may be approved for compression, encryption, or transmission to a remote facility. In this regard, only valid (e.g., useful) data may be transmitted to a remote facility (e.g., cloud storage and processing). In contrast, certain invalid data or all data may be transmitted to a remote facility in which case, invalid data may be processed in an attempt to reconstruct or reconfigure the data into a useful format. Such data recovery techniques may also be performed by an LDCM before data transmission.

Compression algorithm 204 may provide instructions to a processor for reducing data volume. In this regard, a volume of data may be reduced by removing unnecessary bits from the data in order to reduce the overall volume. Data may be compressed by a processor implementing the compression algorithm prior to data storage in local memory in order to reduce the storage volume needed. Additionally or alternatively, data may be compressed after it's been stored on an LDCM (or associated storage device) but before transmission to a remote facility. In this regard, data transfers may be expedited due to a reduced number of bits needing to be transmitted to convey the data.

Encryption algorithm 205 may include a method for encoding data prior to transmission to ensure privacy and security. The method may include protocols such as secure sockets layer (SSL) or transport layer security (TLS), for example. Data encryption may prevent unauthorized users from accessing or using the data if it is intercepted, such as during transmission from an LDCM to a remote facility. Data may also be encrypted before storage on an LDCM to prevent data use in the event an LDCM is hacked or data is otherwise compromised. Privacy concerns may also support the use of data encryption or other methods of obfuscation. For instance, some data being transmitted by an LDCM may comprise video recordings from a traffic camera which may contain license plate numbers, facial images, or other personally identifiable information which motorists may desire be maintained in confidence.

Transmission algorithm 206 may include a method for sending data to a remote facility. Such method may include steps such as retrieval of data from memory, packaging of data, formatting, etc. A processor such as processor 106 of FIG. 1 may access transmission algorithm 206 stored within memory of an LDCM. Utilizing transmission algorithm 206, the processor may retrieve and transmit traffic data (e.g., traffic data stored in memory module 108 of FIG. 1) to a remote facility. Such transmitting may be performed via a wired network connection (e.g., Ethernet) or wireless protocol (e.g., Bluetooth, WiFi, 4G LTE, etc.). A communication module may be integrated into an LDCM for performance of such transmissions. Alternatively, a communications module of another traffic hardware device disposed adjacent to an LDCM may be accessible by an LDCM for coordinated transmission. In this regard, transmission algorithm 206 may include instructions for communication with an external (i.e., outside the LDCM) device or system.

Figure 3:
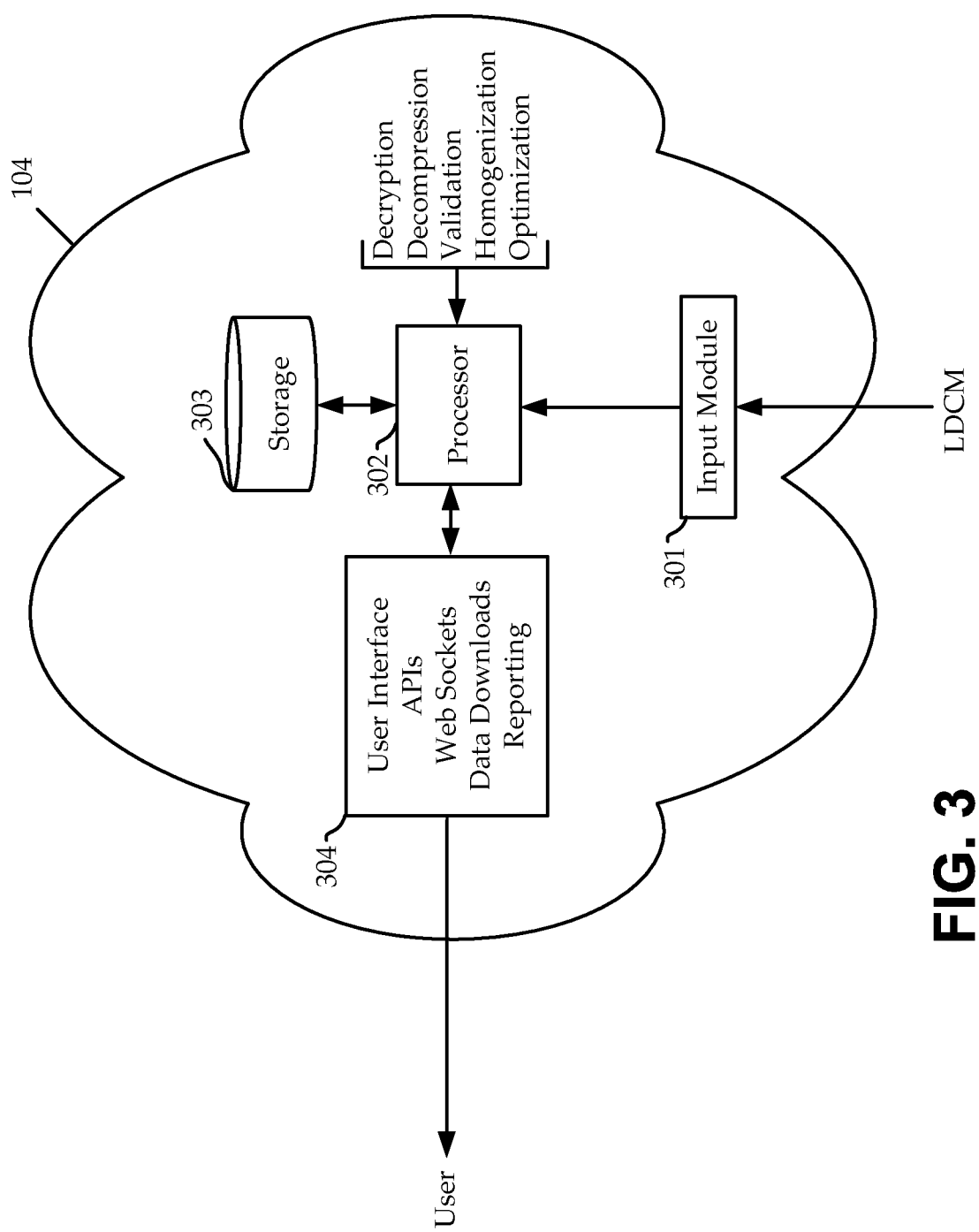
FIG. 3 illustrates an embodiment of a cloud system in accordance with an embodiment of the present invention.

Turning to FIG. 3, an embodiment of a cloud system 104 in accordance with the present invention (e.g., storage and/or processing system) is illustrated. Traffic data is received from an LDCM through input module 301. Input module 301 may be any device or application configured for the receipt of data from outside sources, for example, a network card, a communications port, etc. Data received through input module 301 may be routed by processor 302 to storage 303. While receiving or after storage of the data, processor 302 may implement various data processing methods. These may include decryption, decompression, validation, homogenization, and/or optimization of the data.

The cloud system 104 may be accessible to users (e.g., clients) for various purposes such as traffic signal timing optimization, traffic monitoring, roadway and infrastructure planning, traffic impact studies, advertising campaign strategy and verification, etc. It should be appreciated that these examples are provided for illustration and should not be considered limiting. Traffic data may be accessible to users via a web server 304 in a number of manners. For example, a user interface may be available via a website or on a local terminal. The user interface may provide a user with a variety of tools for data manipulation, filtering, generating graphics, etc. In such an instance, processor 302 may be operable to perform various functions and return a graphical result to a user. For example, a user may request all data pertaining to the northbound, left turn approach at a given intersection during a specific interval of time. Processor 302 may access traffic data from storage 303 and filter such traffic data according to the specifications provided by the user. A list of filtered data complying with the specifications may be returned to the user via the user interface. Importantly, a user interface may allow a user to access traffic data on a cloud storage drive without needing to download the data to the user's computer. Alternatively, a user interface may provide an option for a user to download data to a local drive.

Traffic data may also be accessible to users via an application programming interface ("API"). For example, WebSockets may be used to establish communication between a user's network-connected device and the server hosting the cloud system 104. Utilizing an API, traffic data (raw or processed) may be downloaded to a user's device. In one implementation, a user such as a municipality operating a traffic network may opt to continuously download data in a streaming fashion. In this manner, as data is received at the cloud system 104, it may be directed to the user's local system. A number of client users may simultaneously maintain a connection to the cloud system 104, in which case a processor 302 may be operable to route data to the appropriate client(s). In other implementations, a user may manually request a download of data from the cloud system 104 on demand, or may set up a recurring download (e.g., twice daily).

Depending on the intended use of traffic data by an end user, cloud system 104 may be operable to perform varying degrees of data processing. For example, a user may desire raw, unprocessed traffic data in real-time. In such an instance, cloud system 104 may route data to the user as it is received. Cloud system 104 may or may not also make a duplicate copy of the data to be stored in storage 303. In another example, a user may desire extensive data analytics be performed at the cloud system 104 prior to receipt at the user's terminal. In such a case, processor 302 (or a number of processors associated with a cloud system) may perform various analyses to generate graphics, reports, tables, etc. to be sent to or accessed by a client user. Such analyses may be performed automatically as data is received or data may be stored in storage 303 until such time that a user submits a request for an analysis be performed. In response to receipt of a request, processor 302 of cloud system 104 may perform requested analyses.

In an embodiment, cloud system 104 may analyze data as it is received. In some instances, this may be at the request of a client and in other instances it may be automatic. As data is received, certain characteristics of traffic data may be analyzed. Resultant data (i.e., data generated from calculations performed on the traffic data) may be compared against threshold values to identify certain desirable or undesirable characteristics. For example, cloud system 104 may continuously monitor incoming data associated with a particular intersection. A client user may input a threshold value for vehicles' wait times at a particular approach (e.g., 60 seconds). In the event that cloud system 104 determines vehicles at the particular approach are waiting for a period of time in excess of the threshold value (e.g., by monitoring camera feeds or using other traffic hardware devices), processor 302 may generate an alert to be sent to the client user (e.g., via Web Sockets, email, text, etc.). Alerts may be generated for any number of conditions which may occur at an intersection or along a monitored roadway including, but not limited to, congestion, weather, travel times, maintenance issues, accidents, etc. A user may enter a custom alert request into a user interface specifying a condition and a threshold value (may be 0 for certain undesirable situations). In response, cloud system 104 may begin monitoring for the condition and generating alerts if/when conditions are met. In other instances, pre-programmed alert settings may be selectable by a user, or automatically implemented by default.

In another embodiment, cloud system 104 may be operable to generate periodic reports. For example, a municipality may subscribe to receive traffic data reports on a monthly basis. In response, cloud system 104 may calculate reporting statistics monthly or more frequently and generate automated reports. These reports may contain statistics requested by the user receiving the report or may be standardized. As an example, a report may contain average transit times through selected corridors, minimum and maximum wait times at certain intersections, number of accidents observed, etc.

Figure 4:
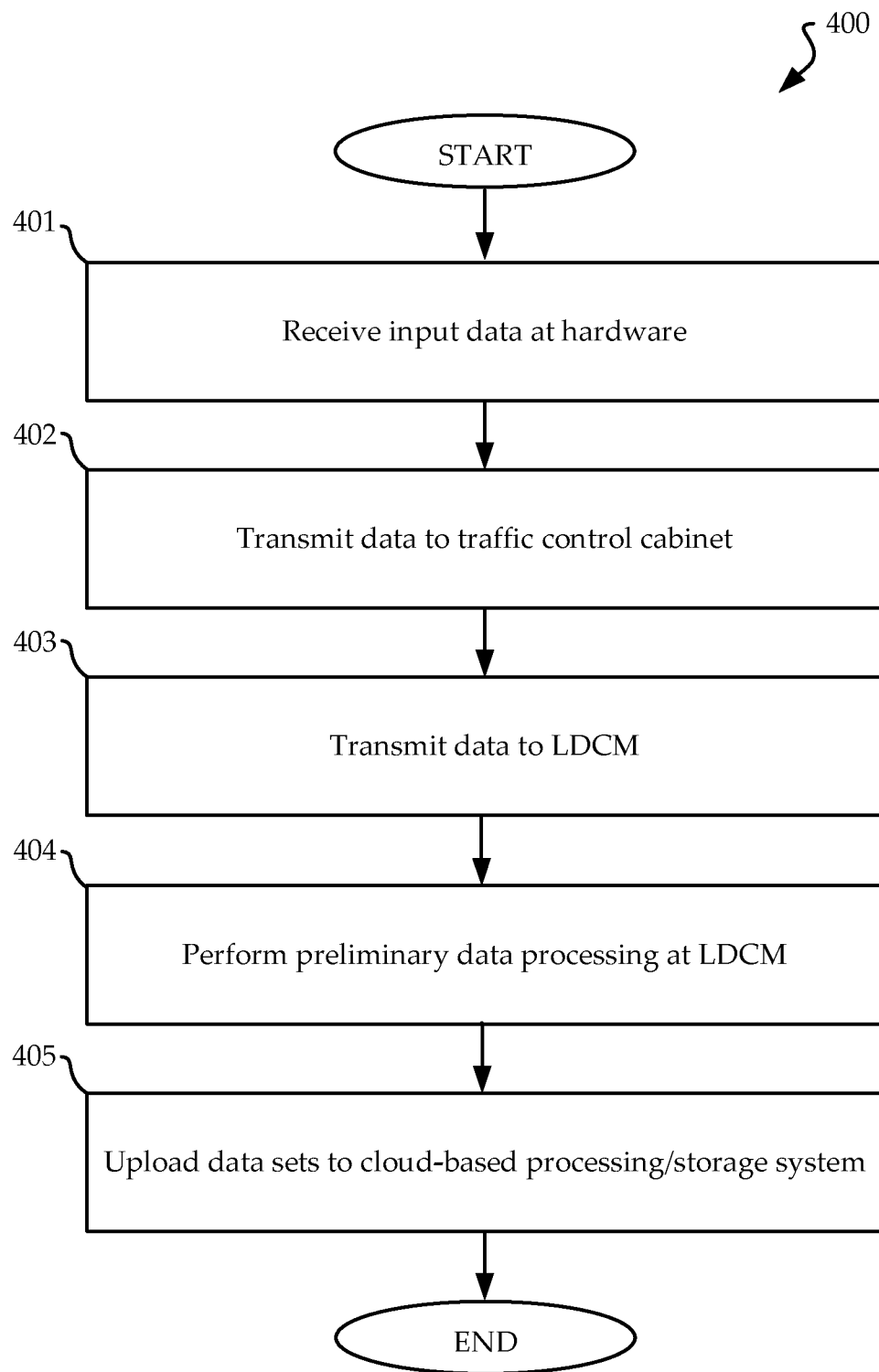
FIG. 4 is a flowchart depicting a method of data transfer and processing in accordance with an embodiment of the present invention.

Turning to FIG. 4, a method of collecting and transmitting traffic data 400 is illustrated. Initially, various traffic hardware devices (e.g., traffic hardware devices 101-103 of FIG. 1) may receive input and generate traffic data corresponding to conditions present at an intersection or other monitored roadway feature 401. Input received by traffic hardware devices may encompass any number of conditions. For example, a camera may receive input in the form of light reflected from various surfaces, a loop detector may receive input in the form of an electromagnetic field or interference therewith, or a traffic signal controller may receive input in the form of electronic communications received from a traffic control center through a network connection. Traffic hardware devices may then transmit input data to a traffic control cabinet (or another hardware device disposed locally) or may generate and transmit traffic data in response to the received input data 402. Traffic data, as that term is used herein, may refer to any data related to traffic including, but not limited to, input data (e.g., data received at traffic hardware devices), generated data (e.g., data produced by traffic hardware devices in response to receiving input data), raw data (e.g., data received by an LDCM and stored without further processing), processed data (e.g., data which has been compressed, encrypted, or otherwise manipulated), report data (e.g., data created to be transmitted to users for informational use), etc.

Traffic data received at a traffic control cabinet may be further transmitted to an LDCM 403. In some embodiments, various other components and devices within a traffic control cabinet may be networked to an LDCM for direct communication therewith. In this regard, an LDCM may be wired (or wirelessly connected) to other hardware components disposed adjacent a roadway site to be monitored by the LDCM. The LDCM may send requests to the various traffic control cabinet components, prompting them to transmit traffic data to the LDCM. Alternatively, the traffic control cabinet components may be configured to automatically send traffic data to an LDCM.

Upon receipt of traffic data at an LDCM, the LDCM may process the traffic data 404. The traffic data may be processed in any manner, such as in accordance with the algorithms discussed above in relation to FIG. 2. For example, traffic data may be validated, compressed, or encrypted. Notably, processing of traffic data at an LDCM may be comprehensive or may be limited to simply storing data in a local storage device, routing data to remote facility, associating data with a time stamp, or analyzing data and determining that the data should be discarded. Processed traffic data may be uploaded (i.e., transmitted) to a cloud-based processing or storage system (or other remote storage location, for example, a municipality's traffic control center) 405.

Figure 5:
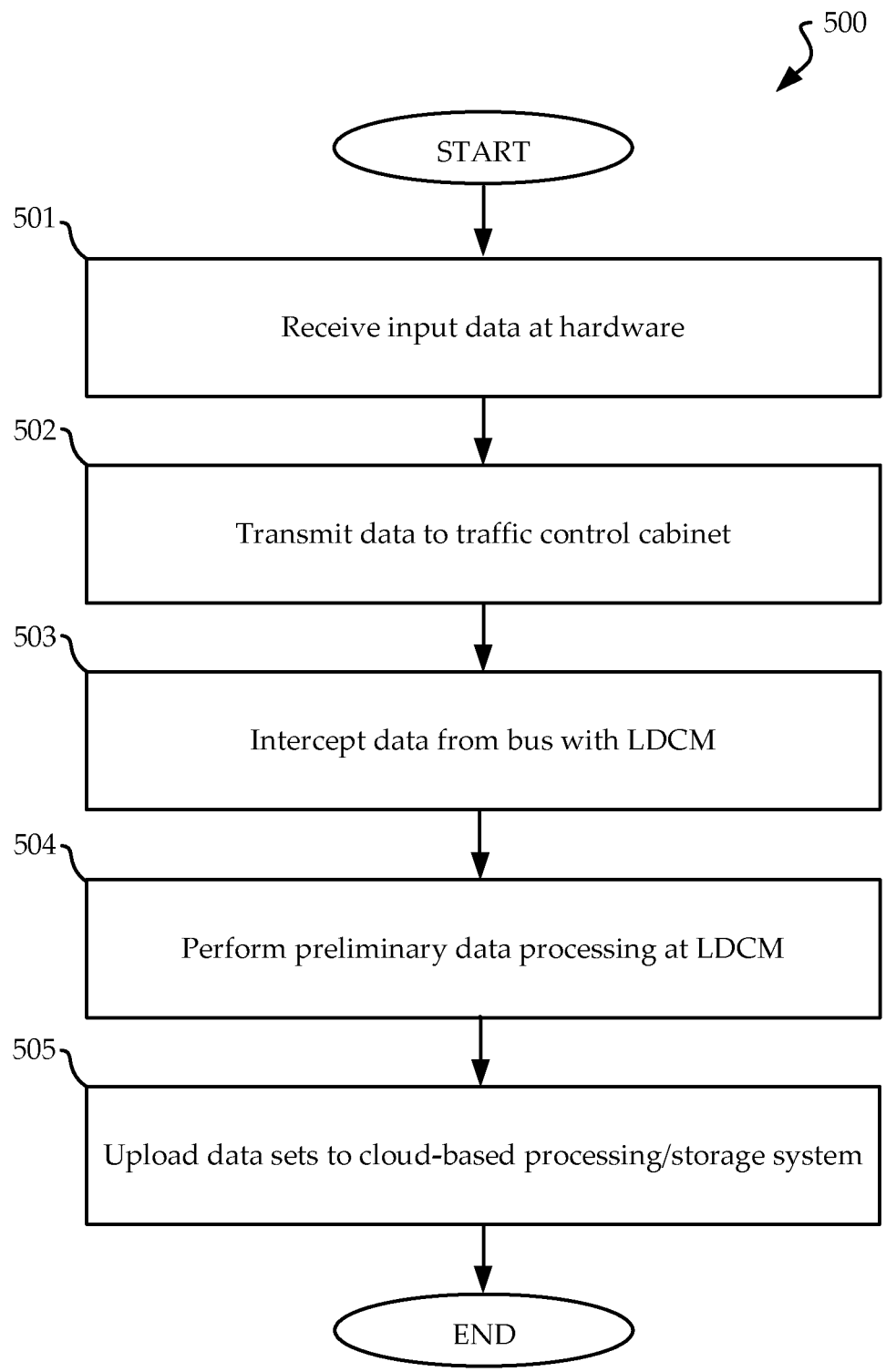
FIG. 5 is a flowchart depicting another method of data transfer and processing in accordance with an embodiment of the present invention.

FIG. 5 illustrates a method of collecting and transmitting traffic data 500 similar to method 400. Input data may be received at a traffic hardware device 501 and traffic data (the same as or different than the input data) may be transmitted to a traffic control cabinet (e.g., hardware or systems disposed within a traffic control cabinet) 502. Rather than transmitting data directly to an LDCM (as described in method 400), an LDCM may passively intercept traffic data being conveyed between other devices via a data bus, by monitoring wireless communications, etc. 503. Upon being intercepted by an LDCM, the LDCM may perform preliminary processing of the traffic data 504 and may transmit the traffic data to a remote storage facility such as a cloud system 505.

Figure 6:
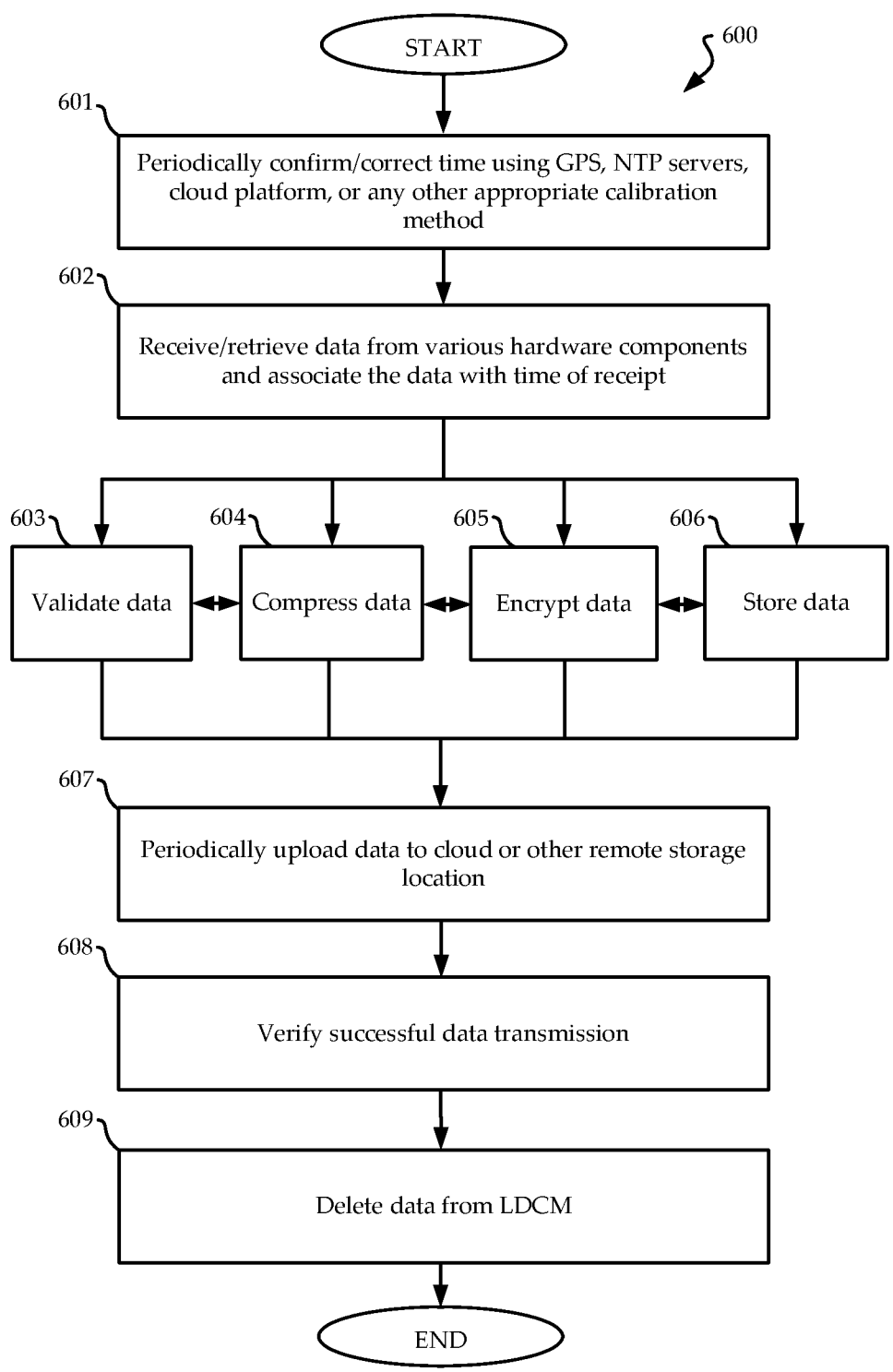
FIG. 6 is a flowchart depicting data management by an embodiment of a localized data collection module.

Turning to FIG. 6, a method of collecting and transmitting traffic data as may be performed by an LDCM is illustrated. An LDCM may periodically correct an internal clock 601. Such clock correction may be performed by referencing a GPS time-keeping receiver, NTP servers, etc. Time calibration hardware may be separate from or integrated with an LDCM itself. That is to say, an LDCM may not maintain an internal clock but rather may retrieve or receive time information from another traffic hardware device disposed locally at a traffic control cabinet. For example, a modem disposed within a traffic control cabinet may perform time-keeping and corrections as described herein, and an LDCM may be in operative communication with such modem (or other device) and reliant upon the clock maintained thereby.

An LDCM may receive or retrieve traffic data from (or intercept data being transmitted between) various traffic hardware devices disposed within or adjacent the traffic control cabinet. The LDCM may associate a time with each item of data received 602. For example, the LDCM may receive an item of data (e.g., a car was detected by a loop detector), reference the clock discussed above, and store the item of data and a time stamp indicating the time at which the item of data was received. In some instances, a time stamp may be transmitted with traffic data from various traffic hardware devices (either external or internal to the traffic control cabinet), in which case the LDCM may or may not associate an additional time stamp with the traffic data. The LDCM may be configured to override the received time stamp and substitute it with a time stamp generated by the LDCM in order to maintain uniformity among time stamps as a function of generating the time stamps based upon a single clock.

Upon receipt of traffic data at the LDCM, the traffic data may be preliminarily processed, for example, it may be validated 603, compressed 604, encrypted 605, or stored 606. Each of these steps may be performed in any order, some steps may be performed more than once, and each step may be optional. For example, traffic data may be validated immediately upon receipt, then compressed, after which the data is again validated to ensure integrity. Similarly, data may be stored in the format in which it is received and then later compressed and encrypted immediately before being transmitted to a remote facility.

Periodically, traffic data may be uploaded to a cloud system or other storage facility 607. The period of upload may be variable. For example, traffic data may be uploaded constantly in a streaming manner as it is received at an LDCM. In one embodiment, traffic data may be broadcast from an LDCM for receipt by traffic signal monitoring devices (e.g., autonomous vehicles, mobile devices, etc.). Alternatively, traffic data may be uploaded to remote storage facility, for example, once a month. Following traffic data uploads, an LDCM may be in operative communication with a remote facility to verify that traffic data was uploaded successfully 608. In an embodiment, the LDCM may transmit a request to the remote facility in response to which the remote facility may return a confirmation message. In another embodiment, the remote facility may be configured to automatically transmit a confirmation message to an LDCM following receipt of traffic data from the LDCM. A confirmation message may contain any appropriate indication of successful data receipt including data volume received, a sampling of the data received, etc. After verification of the data transmission, the LDCM may delete traffic data which has been successfully uploaded 609. Traffic data may be deleted immediately or at any other time following a successful upload or may remain on the storage drive of the LCDM until such time the data needs to be overwritten to accommodate new data.

Figure 7:
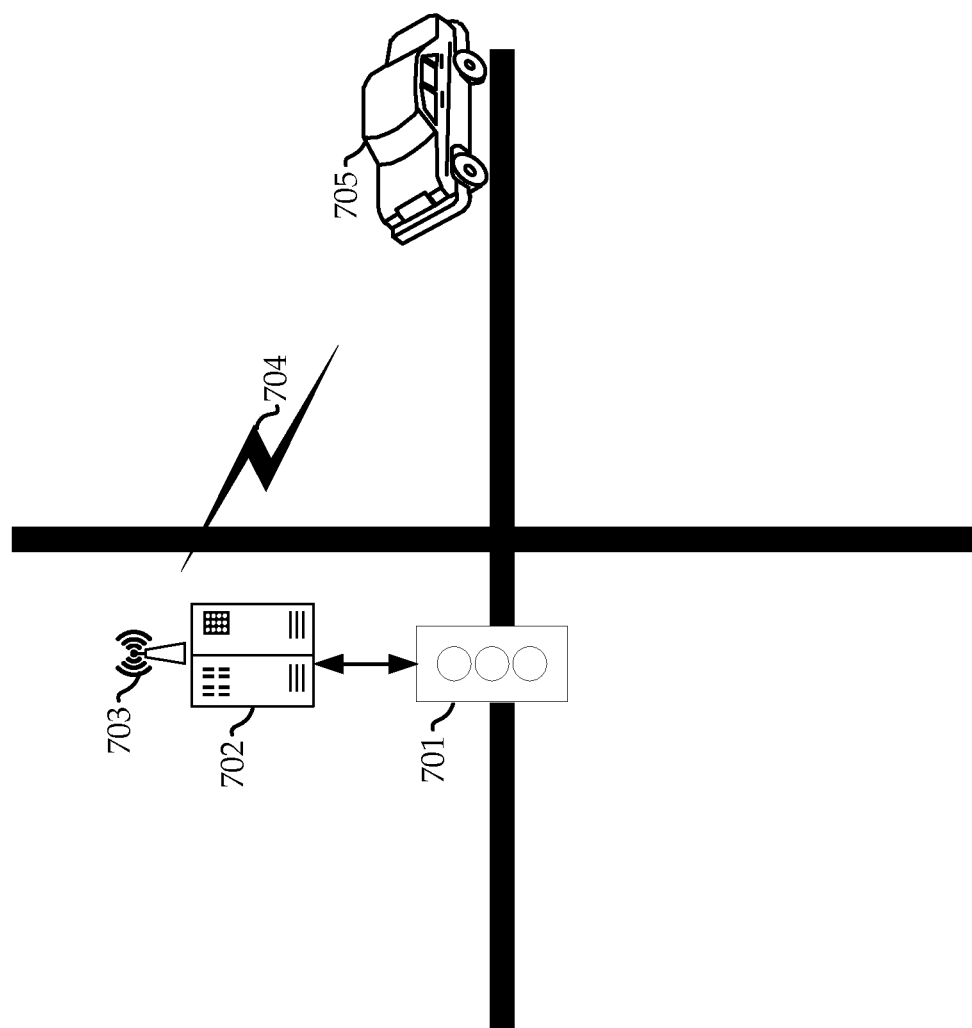
FIG. 7 is a schematic overview of a communications protocol according to the present invention

FIG. 7 illustrates an embodiment of a communications protocol according to the present invention. A traffic signal 701 may be in operative communication with hardware such as a traffic controller (or other hardware in a traffic control cabinet) 702. The traffic controller 702 may send signals to the traffic signal 701, thereby controlling the operation of the lights in the traffic signal 701. The control of the lights may be responsive to events occurring at the intersection (e.g., a vehicle triggers a loop detector) in which case the control of the lights may be dynamic. In other situations, the control of the lights may be in accordance with a pre-established schedule. In any regard, as a vehicle 705 approaches an intersection, traffic data may be communicated to the vehicle 705 via a wireless communications channel 704 established between the wireless port 703 of the traffic controller 702 and a wireless receiver within the vehicle 705. It should be noted that the word "vehicle" as used herein, may refer to an autonomous vehicle, a mobile phone within a vehicle, a traffic signal monitoring device, a GPS system associated with a vehicle, etc. The traffic data sent to vehicle 705 may include the current traffic signal phase being indicated by the lights of the traffic signal, the time remaining in the current traffic signal phase, any subsequent traffic signal phase to be indicated by the light and its planned duration, an indication of the status of the traffic signal (e.g., following an established schedule or operating dynamically), a catalog of planned traffic signal phases (e.g., the next 50 cycles of the light with each approach, phase, timing, etc.), etc. The traffic data transmitted to the vehicle 705 may include information pertaining to a specific traffic signal (e.g., the specific traffic signal in the vehicle's lane), a specific approach (e.g., all signals pertaining to the vehicle's approach), the intersection (e.g., all lights for all approaches at the intersection), a region (e.g., all lights within a 1 mile radius), or any combination thereof. Notably, traffic data sent to the vehicle 705 may include other data not directly associated with traffic signal timing such as a warning about conditions (e.g., an accident, wind, ice, etc.), weather forecasts, traffic volume and speed, etc.

A processor associated with vehicle 705 may be operable to interpret the traffic data and provide instructions to other devices, components, or systems associated with the processor. For example, vehicle 705 may issue an alert to an occupant of the vehicle 705 indicating that the traffic signal it is approaching is red. Notably, the processor may be an integrated component of vehicle 705 such as in the context of an autonomous vehicle, or may be associated with another device which is disposed in the vehicle. For example, the processor may be a component of or otherwise in operative communication with other devices associated with the vehicle 705 (e.g., GPS receiver, emergency braking system, autonomous vehicle control system, audio system, display monitor, mobile phone, etc.). In this regard, received traffic data may be utilized for a number of implementations. For instance, a GPS navigation system may access the traffic data to calculate a route which takes into consideration the timings associated with each traffic signal along the route. Specifically, while a first route may be shorter than a second route, the second route may include more traffic signals which are scheduled to be green at the time the vehicle 705 is expected to reach each of those traffic signals, thus reducing the overall travel time as compared to the first route. As another example, many modern vehicles are equipped with emergency braking systems (or other autonomous or partially autonomous systems) which may apply a vehicle's brakes even in the absence of driver input (e.g., depressing a brake pedal). For example, Subaru® offers the EyeSight® system which may apply a vehicle's brakes when an imminent collision is detected by a sensor system. Traffic data received by vehicle 705 may indicate a particular traffic signal currently is or is about to be red, thereby triggering the processor to query the vehicle's current speed. In the event the vehicle's speed is excessive in view of its proximity to the intersection, a processor may instruct the emergency braking system to activate the brakes.

Figure 8:
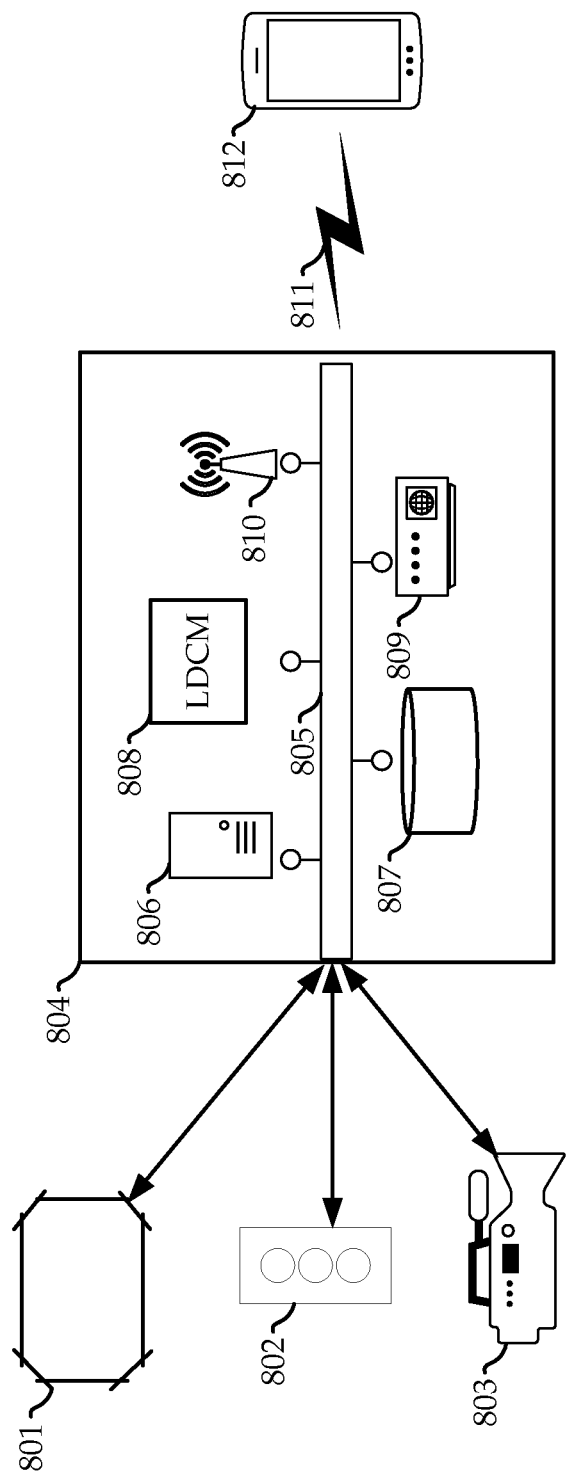
FIG. 8 illustrates an embodiment of a traffic cabinet as may be associated with the present invention.

FIG. 8 illustrates an embodiment of a traffic cabinet as may be associated with the present invention. Traffic hardware devices 801-803 may be disposed within or in operative communication with a traffic control cabinet 804, and more specifically with a data bus 805 within traffic control cabinet 804. In the illustrated example, traffic hardware devices include, but are not limited to, a loop detector 801, a traffic signal 802, and a traffic camera 803. A traffic cabinet 804 may contain, by way of example and not intended to be limiting, a server 806, storage memory 807, an LDCM 808, a modem 809, and a wireless transmitter/receiver 810. Each of these devices may be communicatively coupled to one another via data bus 805 or may be directly connected to one another. Notably, server 806 may be a processor or other processing platform for effecting communications and performing operations associated with the various other devices. Additionally, traffic-specific hardware devices may also be disposed within traffic control cabinet 804 such as a traffic controller, intersection controller, etc. As mentioned above, LDCM 808 may be operative to intercept traffic data as it's conveyed between any other devices through the data bus 805. Traffic data may be transmitted from wireless transmitter/receiver 810 to a user's device 812 via communications channel 811. Notably, if equipped, an LDCM may comprise an integrated wireless transmitter and/or receiver, in which case the LDCM may communicate with a user's device 812 directly. Although depicted as a mobile phone in the illustration, it should be appreciated that a user's device 812 may comprise an autonomous vehicle, a connected vehicle (e.g., includes a 4G hotspot, WiFi connectivity, etc.), an entertainment system, any combination thereof, or any other electronic device offering the functionality described herein.

Figure 9:
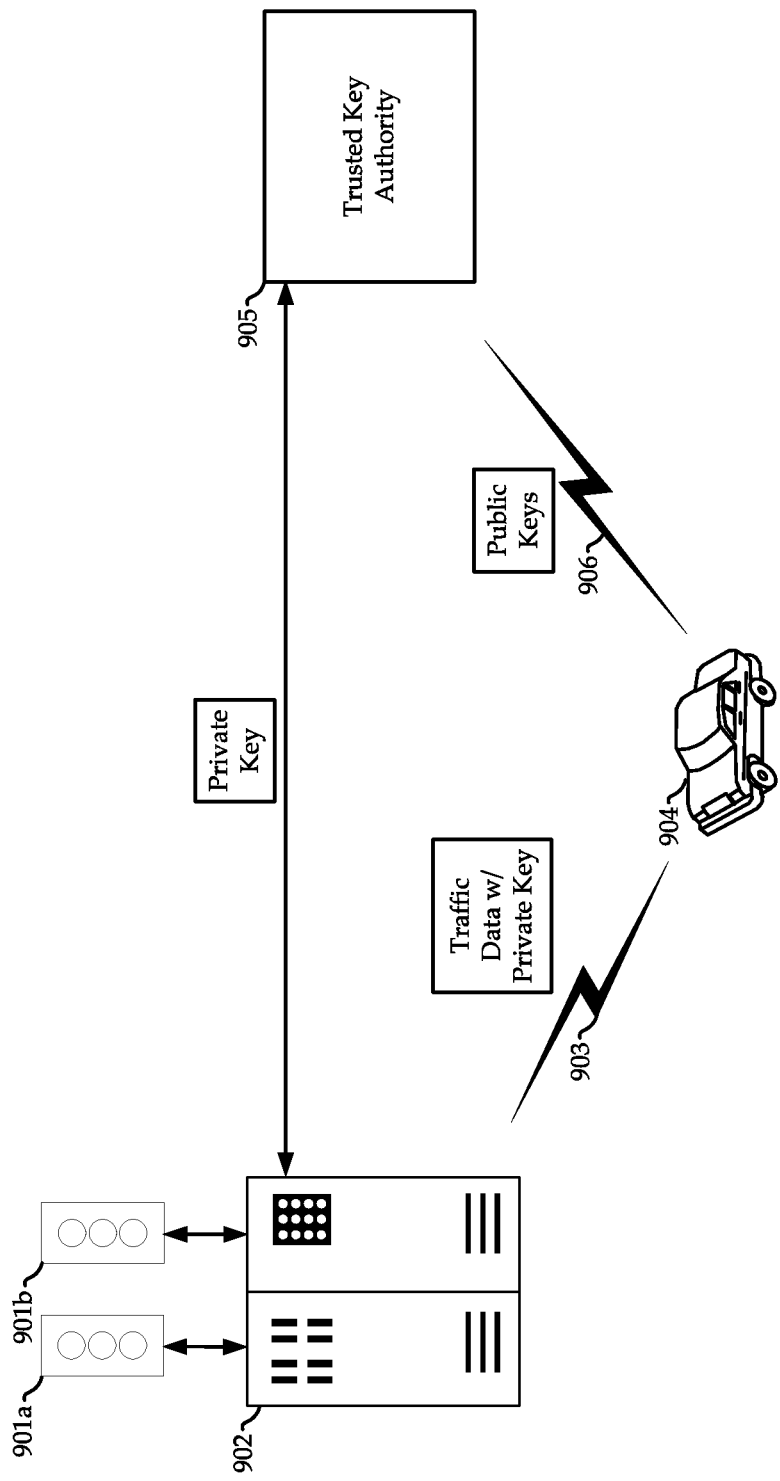
FIG. 9 illustrates an embodiment of an infrastructure to vehicle communications authentication protocol.

FIG. 9 illustrates an embodiment of an infrastructure to vehicle (I2V) communications authentication protocol. A trusted key authority 905 may be tasked with generating public and private keys. Each intersection within a traffic network may be associated with a unique private key. Further, each traffic signal/approach within an intersection may be associated with a private key. Private keys associated with a given intersection may be transmitted to a local storage device within a traffic control cabinet 902. This transmission may occur wirelessly, such as over WiFi or a data network (e.g., 4G), or may be wired (e.g., Ethernet, telecommunications, closed circuit, etc.). Similarly, trusted key authority 905 may transmit public keys to a device 904 (e.g., autonomous vehicle, mobile phone, GPS navigation system, etc.) via communications channel 906. Transmission of public keys may be provided statically or dynamically. For example, public keys may be downloaded to an autonomous vehicle while it is parked in a garage. Such a vehicle may be connected to a WiFi router to download public keys, for example, while the vehicle is parked and inoperative or when the vehicle's ignition is activated and/or a navigation route is entered. In the instance of a device which is a mobile phone, public keys may be downloaded dynamically, that is to say, continuously updated as the device roams. For example, such a mobile phone may be connected to a network (e.g., 4G) and may download all public keys relevant to the device's route (e.g., for all traffic signals within a given radius or other proximity specification of the device (frequently traversed intersections, within a city/region, etc.) or any traffic signals along a planned route). Downloads of public keys may occur on a set periodic basis (e.g., every 5 minutes), on a geographic basis (e.g., maintain all keys within at least a 2 mile radius), or they may be pushed as updates occur at server associated with the trusted key authority. In some instances, a package of public keys may be downloaded to and maintained on device 904. For example, all traffic signals within a given city may be downloaded to a device and maintained indefinitely. When the trusted key authority 905 issues a revised public key, it may force an update to the device 904.

Traffic signals 901*a* and 901*b* may both be in operative communication with traffic control cabinet 902 (more specifically, with a traffic controller or other device within the cabinet). A device within traffic cabinet 902, for example a traffic controller or an LDCM, may transmit traffic data associated with the traffic signals 901*a*, 901*b*. Notably, such traffic data may be associated with any traffic hardware device, sensor, or receiver associated with the traffic control cabinet. Traffic signals 901*a*, 901*b* are shown only as an example of a source of traffic data. Traffic data may be transmitted from traffic control cabinet 902 to a device 904 via wireless communications channel 903. As traffic data is transmitted, a private key associated with the traffic data is also transmitted (i.e., the traffic data is signed with the private key). In this regard, a device 904 may receive traffic data and a private key associated with the data allowing the device 904 to authenticate the transmission. This may be advantageous, for instance, in reducing the possibility of a spoofed message being incorporated into the processing decisions of a device or in enabling device 904 to ascertain the source of each of a plurality of traffic data transmissions. This may be beneficial in a dense network, as described in regard to FIG. 10.

Figure 10:
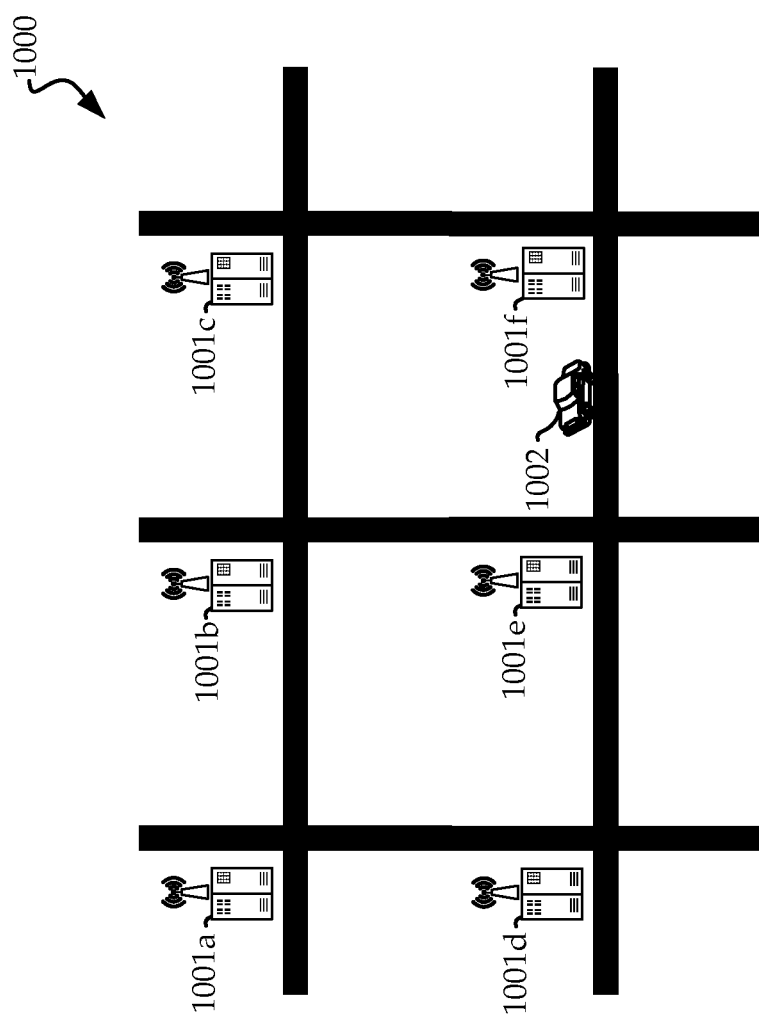
FIG. 10 provides an illustration of a network of signalized intersections communicating with a vehicle.

FIG. 10 provides an illustration of a network 1000 of signalized intersections which may communicate with a vehicle. In the illustration, vehicle (or device) 1002 may be traversing the network of roads with corresponding intersections. Each intersection may or may not have a traffic signal. Each intersection with a traffic signal may or may not have a means for wirelessly transmitting traffic data to vehicles. In the illustrated example, every intersection has a traffic control cabinet with a means for transmitting traffic data wirelessly 1001 (e.g., LDCM). It is contemplated that the wireless transmission range (e.g., 100 ft, 1 mile, 100 miles) of each traffic control cabinet 1001 may overlap with the wireless transmission range of at least one other traffic control cabinet 1001. As one example, assume the transmission range of each traffic control cabinet 1001 is about one city block (i.e., distance between each adjacent intersection in the illustration). Vehicle 1002 may receive traffic data from traffic cabinets 1001*c*, 1001*e*, 1001*f* and perhaps even 1001*b*. Although traffic data in this sense may include any data relevant to the traffic network, for this example traffic data is assumed to include traffic signal phase timings for each approach of each intersection. It is also to be assumed that vehicle 1002 has a planned route (e.g., programmed into GPS navigation system) of a straight line from 1001*f* to 1001*d*. In this regard, vehicle 1002 (note that "vehicle" in this sense may refer to an autonomous vehicle, a mobile phone within a vehicle, a GPS system associated with a vehicle, etc.) may disregard any traffic data being received from traffic signals which are not on the planned route, specifically, 1001a, 1001b and 1001c, so as to avoid unnecessary computations, analysis, or storage. Alternatively, vehicle 1002 may temporarily store (e.g., 10 seconds, 30 seconds, 30 minutes) such traffic data in case the route changes and the traffic data becomes relevant. Regarding traffic data received from traffic control cabinets along the vehicle's route, that is traffic control cabinets 1001d, 1001e, 1001f, the vehicle may selectively monitor any appropriate number of traffic control cabinet transmissions. For example, vehicle 1002 may store all traffic data received from all traffic signals so as to generate a robust pool of data which may be used, for example, for extensive route planning (e.g., planning movements at several intersections in advance). Alternatively, vehicle 1002 may ignore all traffic data except the traffic data pertaining to the vehicle's next encountered intersection (e.g., 1001e). In this regard, a vehicle may monitor only one traffic signal at a time. Traffic data transmission monitoring may be selectively changeable such that a user of vehicle 1002 may alter the constraints for filtering traffic data (e.g., along-route traffic signals only, within a specified radius, etc.).

Figure 11:
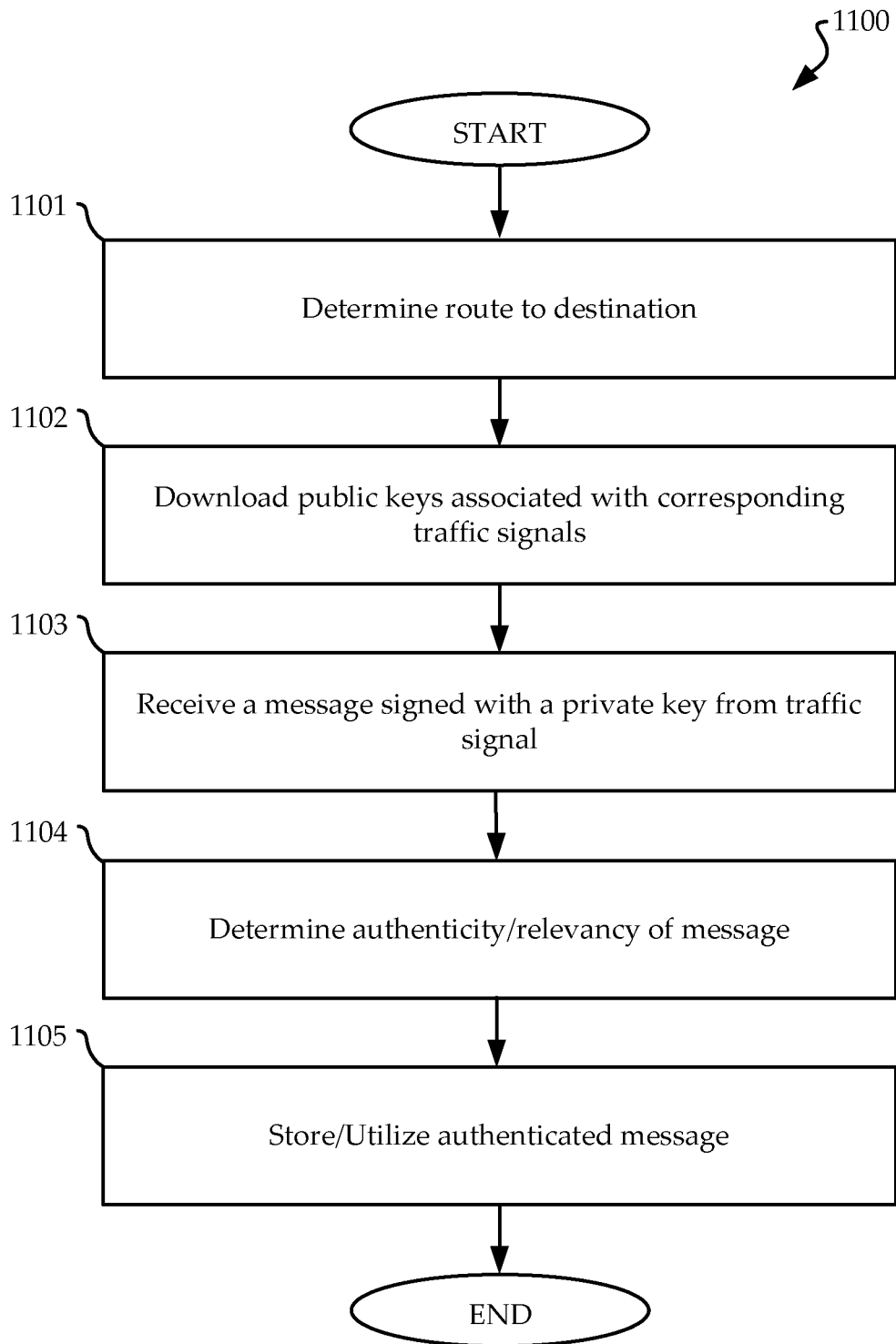
FIG. 11 is a flowchart of a method of authenticating a message received from a traffic signal.

FIG. 11 is a flowchart of a method of authenticating a message received from a traffic signal. Initially, a device (e.g., device 812 of FIG. 8 or vehicle 1002 of FIG. 10) may determine a route 1101. Such determination may be based on any number of factors. For example, the determination may be based upon a route generated by a GPS navigation system. As another example, it may be determined based upon the current status of the vehicle such as location, direction, speed, active turn indicator, etc. In other instances, a route may simply be defined as an area within a particular radius. When a route has been determined, the device may download or otherwise receive (e.g., SD memory card) public keys associated with traffic signals that may be encountered on the route 1102. The public keys may be used immediately, if the vehicle is within range of a traffic signal, to authenticate traffic data or may be stored until needed. The device may receive a message containing traffic data from a traffic signal, the message being signed with a private key associated with the traffic signal 1103. Using the pair of keys, public and private, the device may determine the authenticity of the message and also determine whether or not the traffic data within the message is relevant to the device's route 1104. Messages which are authenticated and deemed relevant may be stored for use while messages which do not pass the authentication analysis or which are deemed irrelevant may be discarded 1105.

Figure 12:
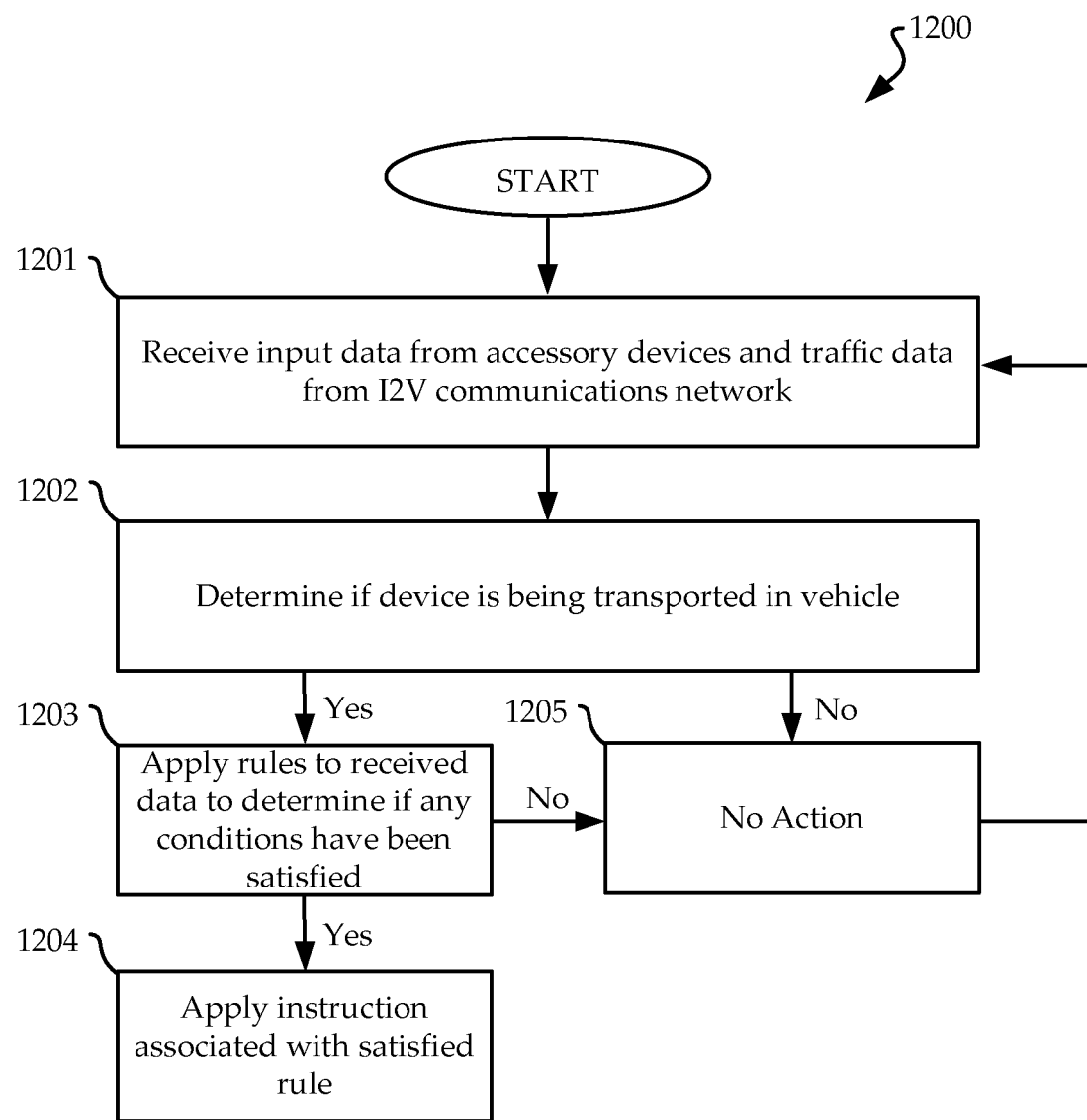
FIG. 12 is a flowchart of a method of monitoring vehicle motion and applying related rules according to an application of the present disclosure.

FIG. 12 is a flowchart of a method of monitoring vehicle motion and applying related rules according to an application of the present disclosure. Initially, input data may be received at a device (e.g., device 812 of FIG. 8 or vehicle 1002 of FIG. 10) from accessory devices (e.g., GPS navigation system, gyroscope) and/or traffic data may be received from an infrastructure to vehicle network 1201. Based on input data, the device may determine whether or not it is being transported in a vehicle 1202 (or if device is a vehicle, it may determine whether or not it is currently being driven based upon factors such as whether or not the transmission is in gear, whether or not the accelerator is depressed, etc.). For instance, gyroscopic sensors within a device may indicate that the device has been subjected to an amount of acceleration corresponding in magnitude and duration to that experienced in a vehicle. Alternatively, the device may determine that changes in traffic data being received from traffic signals indicates movement consistent with a moving vehicle. That is to say, losing contact with a traffic signal and/or obtaining contact with another traffic signal may be sufficient to determine the device is being moved in a vehicle. If the input data and traffic data yield a determination that the device is not being transported in a vehicle, no action is taken and the application may continue to monitor input data and traffic data. If a determination is made that the device is moving in a vehicle, programmed rules may be accessed and applied to the input data or traffic data 1203. Such rules may contain a condition and an instruction. When a condition has been met, the instruction may be applied 1204. When a condition of a rule is not satisfied, no action may be taken and the application may continue monitoring incoming data 1205.

A device may store any number of rules and rules may contain any appropriate conditions and instructions. For example, a rule may have a condition of "speed>5 mph." If the current speed of the vehicle is 10 mph, for example, the condition would be satisfied and the instruction would be applied. The instruction may cause the device to enter a reduced functionality mode (e.g., lock screen, hands-free operation only, emergency calls only, display off, etc.). Additionally or alternatively, the instruction may be for the device to suppress all notifications to a driver. That is to say, if the vehicle is travelling at a speed exceeding the 5 mph threshold, the application may instruct the device to suppress all notifications of incoming text messages, phone calls, emails, etc. In this regard, a driver may be prevented from receiving notifications which are themselves distracting (e.g., audio tone or visual indication on display screen) but moreover, the driver may be prevented from accessing distracting content (e.g., reading a text message). A corresponding rule may have a condition of "speed <5 mph" and an instruction to permit all notifications. In this regard, notifications are suppressed when the vehicle exceeds 5 mph and are permitted once the vehicle slows below 5 mph. In some implementations, rules may utilize input data from a touchscreen to ascertain whether or not a user (e.g., driver) is actively using the device.

In another example of how rules may be applied by an application, advertisements are contemplated. A rule may provide multiple conditions such as "distance from Store A<3 miles," "speed=0 mph," and "current red light duration remaining>10 seconds." If each of the conditions are satisfied (e.g., true), the rule may apply an instruction to "play Store A advertisement." In this regard, a driver may be passing within the general vicinity of Store A when it must stop at a red light. As a function of the input data received, such as a GPS receiver indicating the vehicle is stopped and located within the specified radius of Store A, in combination with traffic data received from a traffic signal, specifically that the red light phase at the approach to which the vehicle is subjected will remain red for at least 10 more seconds, the rule may instruct that a commercial advertisement supplied by Store A should stream on the device. Notably, an advertisement or a package of advertisements may be downloaded onto the device in advance so that they are available on demand. Packages of advertisements may be grouped based upon locations associated with each advertisement (e.g., city block, city limits, county limits, neighborhood, commercial development, etc.). For example, a package of advertisements containing all advertisements available for businesses within a city may be downloaded onto a user's device automatically as the user approaches or enters the city.

To further illustrate, a traffic camera at a given intersection may observe a stalled vehicle in an approach designated as northbound lane 1, for example. This information may be transmitted from the respective traffic control cabinet to vehicles within range. Additionally, a GPS receiver associated with a device may determine that the device is in northbound lane 1. A rule may contain the conditions "obstacle lane=device lane," "distance to obstacle<1000 feet," and "speed>25 mph." In this regard, the conditions all being satisfied may be indicative of a device approaching an obstacle too quickly such that an instruction associated with the rule may instruct the device to issue an alert (e.g., audio warning to slow down). Additionally or alternatively, an instruction may be applied which instructs other systems in communication with the device to take an action (e.g., apply emergency braking).

Figure 13:
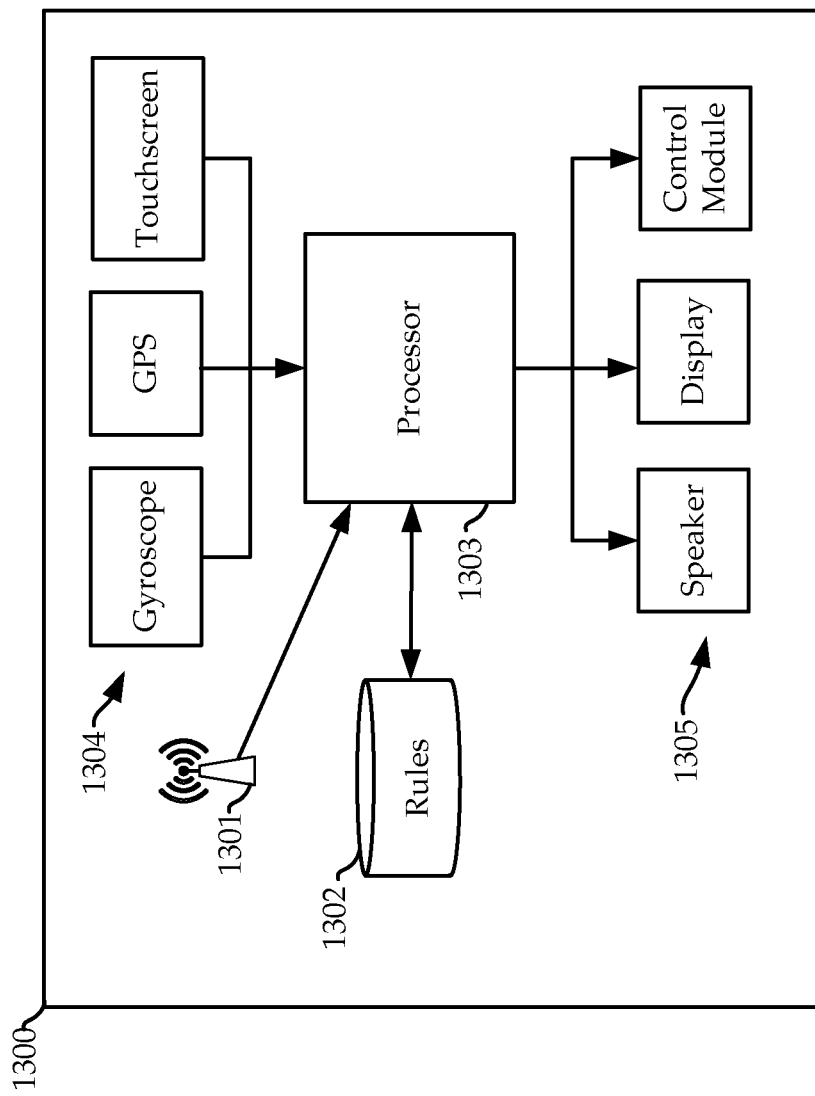
FIG. 13 illustrates a device which may store and run the application of FIG. 12.

FIG. 13 illustrates an example of a device 1300 which may store and run the application associated with FIG. 12. Device 1300 may contain or be in communication with various accessory devices 1304 which assist the device 1300 in calculations. For example, accessory devices 1304 may include a gyroscope, a GPS receiver or navigation system, and a touchscreen display (e.g., smart phone display, integrated vehicle display on dashboard, etc.). Accessory devices 1304 may supply input data to a processor 1303. Similarly, a wireless receiver 1301 may receive and supply traffic data to the processor 1303. Processor 1303 may access a set of rules disposed on a storage device 1302 (e.g., memory module) and apply the rules to the received input data and traffic data. The processor may send instructions to various output devices 1305 in the event that one or all conditions of a rule are satisfied. Such output devices may be, for example, a speaker for playing audio warnings, a display for providing visual alerts, or a control module. In this sense, a control module may be any device operable to control a system which may be responsive to instructions sent from processor 1303. For example, a control module may be associated with an emergency braking or collision avoidance system. Alternately, a control module may be associated with a GPS navigation system. In this regard, the control module may cause the GPS navigation system to alter the planned route in response to an instruction sent from processor 1303.

Figure 14:
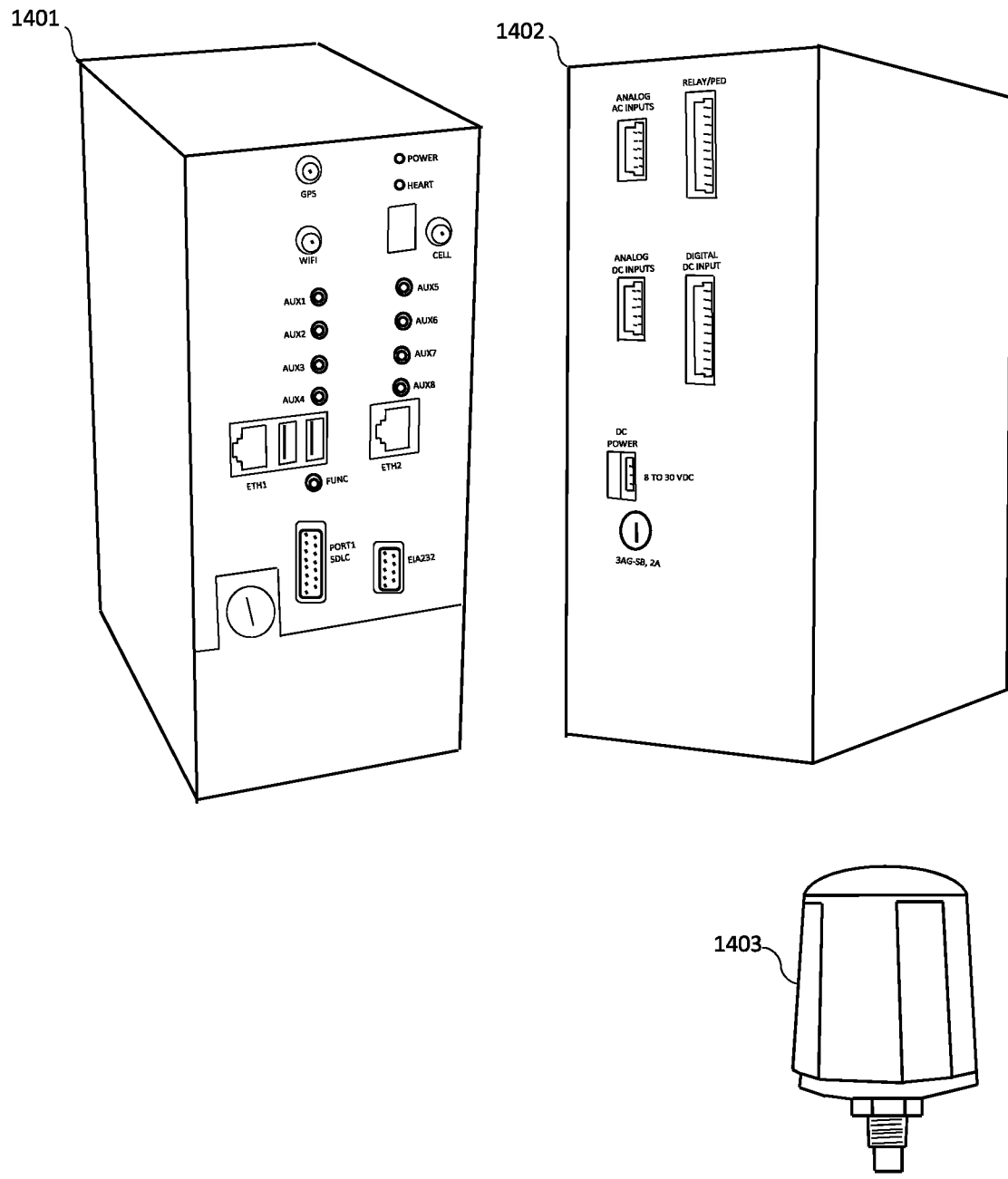
FIG. 14 is an exemplary embodiment of a localized data collection module.

FIG. 14 provides a front view 1401 of an embodiment of an LDCM. A variety of status indicator lights are visible including a power indicator, a GPS signal indicator, a WiFi signal indicator, and a cellular (data) indicator. Additionally, a variety of input/output ports are shown. Turning to a rear view 1402 of an LDCM, additional input/output ports as well as power connections are shown. Antenna 1403 may be attached to or disposed within the LDCM itself or may be disposed elsewhere within, on, or otherwise adjacent to a traffic control cabinet in which the LDCM is disposed.

Notably, any steps in the methods disclosed herein as well as any features of any devices or embodiments disclosed herein, may be optional. Their inclusion in the summary, descriptions, or figures is merely for the sake of illustration and is not intended to assert their necessity.

What is claimed is:

1. A method of filtering and authenticating received messages comprising:
   storing a public key on a memory module disposed within a vehicle and in operative communication with a processor;
   receiving a message via an antenna associated with the vehicle and in operative communication with the processor, wherein the message comprises traffic data signed using a private key corresponding to the stored public key, and wherein the traffic data originates from a traffic hardware device disposed adjacent to a roadway and comprises signal phase and timing information associated with a signal controller at an intersection along the roadway;
   using the stored public key to verify authenticity of the message;
   identifying the traffic hardware device based, at least in part, on the received message;
   determining that the traffic hardware device is associated with a traffic signal relevant to a route of the vehicle;
   transmitting an instruction signal from an output port in operative communication with the processor in response to determining the Message is authentic and relevant;
   accessing a database comprising a plurality of traffic hardware devices, each traffic hardware device having a unique public key associated therewith; and
   downloading a plurality of unique public keys associated with traffic hardware devices that are relevant to the route of the vehicle.

2. The method of claim 1, further comprising:
   accessing the public key from a database containing a plurality of public keys, wherein each public key of the plurality of public keys is associated with a specific traffic data transmitter.

3. The method of claim 2, wherein the accessing occurs in response to referencing a data set generated by a positioning system associated with the vehicle.

4. The method of claim 3, wherein the positioning system comprises a global positioning system navigation system and the data set comprises a location of the vehicle and a proximity specification.

5. The method of claim 3, wherein the positioning system comprises a global positioning system navigation system and the data set comprises an anticipated route of travel associated with the vehicle.

6. The method of claim 1, wherein:
   the vehicle comprises an at least partially autonomous motorized vehicle; and
   the instruction signal is received by a control module associated with the vehicle and effects autonomous movement of the vehicle.

7. The method of claim 1, further comprising:
   receiving a second message via the antenna;
   determining, utilizing the processor, that the second message is extraneous to current functions being performed by the processor;
   disregarding the second message in response to the determining.

8. The method of claim 1, wherein the route of the vehicle comprises a plurality of traffic signals, each of the plurality of traffic signals having a unique public key associated therewith; and
   wherein identifying the traffic hardware device based, at least in part, on the message, further comprises, authenticating the message using the unique public key associated with the traffic signal.

9. The method of claim 1, wherein the traffic data comprises information received from traffic signal controllers disposed adjacent to intersections which are remote from the traffic hardware device.

10. A device for authenticating messages received by a vehicle, the device comprising:
    an antenna configured to receive the messages from a transmitter associated with a traffic control cabinet and a traffic hardware device associated with the traffic control cabinet, each message comprising traffic data signed using a private key corresponding to a public key, wherein the traffic data originates from the traffic hardware device disposed adjacent to a roadway and comprises signal phase and timing information associated with a signal controller at an intersection along the roadway;

a first memory module configured to store a public key associated with the traffic hardware device; and a first processor in operative communication with the antenna and the first memory module and configured to:

authenticate the traffic data utilizing the stored public key to verify authenticity of each message;

identify a geographic location of the traffic hardware device based, at least in part, on the public key, and identify the traffic hardware device based, at least in part, on the received message;

determine that the traffic hardware device is associated with a traffic signal relevant to a route of the vehicle;

transmit an instruction signal from an output port in operative communication with the first processor in response to determining the message is authentic and relevant;

wherein the first processor is also configured to access a database comprising a plurality of traffic hardware devices, each traffic hardware device having a unique public key associated therewith; and download a plurality of unique public keys associated with traffic hardware devices that are relevant to the route of the vehicle.

11. The device of claim 10, wherein the first processor is configured to authenticate traffic data by inserting the stored public key and the traffic data into an authentication algorithm stored on the device and analyzing a result produced by the algorithm.

12. The device of claim 10, further comprising a global positioning system navigation system operable to generate a data set, wherein the first processor is operable to receive a plurality of public keys from a remote database selected as a function of the data set.

13. The device of claim 12, further comprising an output port configured to transmit an instruction signal to be received by a control module in response to determining traffic data is authentic.

14. The device of claim 13, wherein the control module is operable to generate an alert to be conveyed to an operator of the vehicle indicative of a roadway condition associated with the traffic data.

15. The device of claim 14, wherein the alert comprises an audible indication that the vehicle is approaching a hazardous condition and a speed of the vehicle exceeds a threshold value.

16. The device of claim 13, wherein the control module is operable to manipulate autonomous movement of the vehicle.

17. The device of claim 13, wherein the control module is operable to alter a planned route of the vehicle maintained by the global positioning system navigation system.

18. A system comprising the device of claim 10, and further comprising the transmitter, the traffic hardware device, and the traffic control cabinet;

wherein the transmitter is a wireless transmitter operable to transmit traffic data received from the traffic hardware device disposed in the traffic control cabinet adjacent to the roadway intersection;

wherein the system further comprises:

a second memory module operable to store a private key; and a second processor in operative communication with the wireless transmitter and the second memory module and configured to sign the traffic data with the private key after receiving the traffic data from the traffic hardware device and prior to transmitting the traffic data via the wireless transmitter;

wherein the transmitter, the second memory module, and the second processor are parts of a device configured for installation within or on the traffic control cabinet.

19. The system of claim 18, further comprising a network connection accessible by the second processor for receiving an updated private key from a trusted key authority.

* * * * *